United States Patent
Huo et al.

(10) Patent No.: US 12,278,984 B2
(45) Date of Patent: Apr. 15, 2025

(54) INTER PREDICTION METHOD BASED ON MOTION INFORMATION MAPPING TABLES OF PARTITIONS IN GEOMETRICAL PARTITION MODE, ENCODER, DECODER, AND STORAGE MEDIUM

(71) Applicant: GUANGDONG OPPO MOBILE TELECOMMUNICATIONS CORP., LTD., Dongguan (CN)

(72) Inventors: Junyan Huo, Dongguan (CN); Yanzhuo Ma, Dongguan (CN); Shuai Wan, Dongguan (CN); Fuzheng Yang, Dongguan (CN); Qihong Ran, Dongguan (CN); Ruipeng Qiu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 3 days.

(21) Appl. No.: 17/952,237

(22) Filed: Sep. 24, 2022

(65) Prior Publication Data
US 2023/0023856 A1    Jan. 26, 2023

Related U.S. Application Data

(63) Continuation of application No. PCT/CN2020/083380, filed on Apr. 3, 2020.

(51) Int. Cl.
*H04N 11/02* (2006.01)
*H04N 19/109* (2014.01)
(Continued)

(52) U.S. Cl.
CPC .......... *H04N 19/52* (2014.11); *H04N 19/109* (2014.11); *H04N 19/119* (2014.11); *H04N 19/139* (2014.11); *H04N 19/176* (2014.11)

(58) Field of Classification Search
CPC ...................................................... H04N 19/52
(Continued)

(56) References Cited

U.S. PATENT DOCUMENTS 10,080,029 B2    9/2018    Bang
10,412,403 B2    9/2019    Bang
(Continued)

FOREIGN PATENT DOCUMENTS

CN    102611880 A    7/2012
CN    109819255 A    5/2019
(Continued)

OTHER PUBLICATIONS

International Search Report in the international application No. PCT/CN2020/083380, mailed on Jan. 7, 2021.
(Continued)

*Primary Examiner* — Leron Beck
(74) *Attorney, Agent, or Firm* — BAYES PLLC

(57) ABSTRACT

Provided are inter prediction methods and a decoder. In the method, a bitstream is parsed to determine a prediction mode parameter of a current block; a Geometrical Partition Mode (GPM) parameter of the current block and a merge candidate list of the current block and attribute information of motion information in the merge candidate list are determined when the prediction mode parameter indicates to determine an inter prediction value of the current block by using GPM; a first motion information mapping table of a first partition and a second motion information mapping table of a second partition are determined according to the GPM parameter, merge candidate list and attribute information; and the inter prediction value of the current block is determined based on the first and second motion information mapping tables and merge candidate list.

17 Claims, 10 Drawing Sheets

(51) Int. Cl.
*H04N 19/119* (2014.01)
*H04N 19/139* (2014.01)
*H04N 19/176* (2014.01)
*H04N 19/52* (2014.01)

(58) Field of Classification Search
USPC .............................................. 375/240.01–29
See application file for complete search history.

(56) References Cited

U.S. PATENT DOCUMENTS

| | | |
|---|---|---|
| 2016/0381374 A1 | 12/2016 | Bang et al. |
| 2018/0359481 A1 | 12/2018 | Bang et al. |
| 2019/0141334 A1 | 5/2019 | Lim |
| 2020/0404267 A1* | 12/2020 | Liao ........................ H04N 19/52 |
| 2021/0058617 A1* | 2/2021 | Reuze ................... H04N 19/537 |
| 2021/0067776 A1* | 3/2021 | Reuze ................... H04N 19/139 |
| 2021/0160520 A1* | 5/2021 | Chen ....................... H04N 19/14 |
| 2021/0160528 A1* | 5/2021 | Chen ..................... H04N 19/513 |
| 2021/0195200 A1* | 6/2021 | Chen ..................... H04N 19/119 |
| 2021/0227206 A1* | 7/2021 | Chiu ....................... H04N 19/70 |
| 2021/0314586 A1* | 10/2021 | Li ........................ H04N 19/132 |

FOREIGN PATENT DOCUMENTS

| | | |
|---|---|---|
| CN | 109922336 A | 6/2019 |
| CN | 110809161 A | 2/2020 |
| CN | 110944171 A | 3/2020 |
| EP | 3062518 A1 | 8/2016 |
| EP | 3720131 A1 | 10/2020 |
| WO | 2019221103 A1 | 11/2019 |

OTHER PUBLICATIONS

English translation of the Written Opinion of the International Searching Authority in the international application No. PCT/CN2020/083380, mailed on Jan. 7, 2021.
Wang (Kwai) X et al: "Non-CE10: Triangle prediction merge index coding", 13. JVET Meeting; Jan. 9, 2019-Jan. 18, 2019; Marrakech; (The Joint Video Exploration Team of ISO/IEC JTC1/SC29/WG11 and ITU-T SG.16 ),No. JVET-M0234 Jan. 13, 2019 (Jan. 13, 2019), XP030201925.
Extended European Search Report in the European application No. 20928732.5, mailed on Mar. 22, 2023.
First Office Action of the Japanese application No. 2022-555840, issued on Apr. 23, 2024. 10 pages with English translation.
Office Action of the Indian application No. 202217060673, issued on Dec. 22, 2023. 7 pages with English translation.
First Office Action of the Taiwanese application No. 110109407, received on Nov. 27, 2024. 20 pages with English translation.
First Office Action of the Indonesian application No. P00202210807, issued on Jan. 6, 2025. 5 pages with English translation.
Hearing Notice of the Indian application No. 202217060673, issued on Jan. 8, 2025. 3 pages with English translation.
First Office Action of the European application No. 20928732.5, issued on Feb. 20, 2025. 6 pages.

* cited by examiner

INTER PREDICTION METHOD BASED ON MOTION INFORMATION MAPPING TABLES OF PARTITIONS IN GEOMETRICAL PARTITION MODE, ENCODER, DECODER, AND STORAGE MEDIUM

CROSS-REFERENCE TO RELATED APPLICATION

This application is a continuation of International Application No. PCT/CN2020/083380, filed on Apr. 3, 2020, which is hereby incorporated by reference in its entirety.

BACKGROUND

In video coding/decoding, an inter prediction mode, in addition to intra prediction, may be used in a coding/decoding process of a current block. Inter prediction may include motion estimation and motion compensation. For motion compensation, a Geometrical Partition Mode (GPM) may be used to partition an inter current block into two non-rectangular partitions for prediction and weighted merging, thereby obtaining a predicted value of the current block.

Currently, in a GPM-based prediction process, a corresponding motion information candidate list (unidirectional merge candidate list) needs to be constructed. In fact, the motion information candidate list is selected from a conventional motion information candidate list (merge list) by parity check. That is, respective motion information of the two partitions obtained by the GPM is selected from the same unidirectional merge candidate list.

However, respective candidate motion information of the two partitions obtained by the GPM is currently selected indiscriminately from the same merge candidate list. As a result, when motion information to be used is selected for each partition, best candidate motion information may not be selected, or the best candidate motion information is selected but a prediction effect achieved by using the best candidate motion information is not so good.

SUMMARY

The embodiments of the application provide inter prediction methods and a decoder.

In a first aspect, the embodiments of the application provide an inter prediction method, which may be applied to a decoder and include the following operations. A bitstream is parsed to determine a prediction mode parameter of a current block. A GPM parameter of the current block and a merge candidate list of the current block and attribute information of motion information in the merge candidate list is determined when the prediction mode parameter indicates to determine an inter prediction value of the current block by using GPM. A first motion information mapping table of a first partition and a second motion information mapping table of a second partition are determined according to the GPM parameter, the merge candidate list, and the attribute information. The inter prediction value of the current block is determined based on the first motion information mapping table, the second motion information mapping table, and the merge candidate list.

In a second aspect, the embodiments of the application provide an inter prediction method, which may be applied to an encoder and include the following operations. A prediction mode parameter of a current block is determined. A GPM parameter of the current block and a merge candidate list of the current block and attribute information of motion information in the merge candidate list is determined when the prediction mode parameter indicates to determine an inter prediction value of the current block by using GPM. A first motion information mapping table of a first partition and a second motion information mapping table of a second partition are determined according to the GPM parameter, the merge candidate list, and the attribute information. The inter prediction value of the current block is determined based on the first motion information mapping table, the second motion information mapping table, and the merge candidate list.

In a third aspect, the embodiments of the application also provide a decoder, which may include a first memory and a first processor. The first memory may store a computer program capable of running in the first processor. The first processor may execute the program to implement the inter prediction method for a decoder.

BRIEF DESCRIPTION OF THE DRAWINGS

FIG. 14A is an exemplary schematic diagram of first weight values of luminance according to an embodiment of the disclosure.

FIG. 14B is an exemplary schematic diagram of first weight values of chrominance according to an embodiment of the disclosure.

DETAILED DESCRIPTION

In order to make the characteristics and technical contents of the embodiments of the application understood in more detail, the implementation of the embodiments of the application will be described below in combination with the drawings in detail. The appended drawings are only for description as references and not intended to limit the embodiments of the application.

In a video image, a first image component, a second image component, and a third image component are usually used to represent a Coding Block (CB). The three image components are a luminance component, a blue chrominance component, and a red chrominance component respectively. Specifically, the luminance component is usually represented by sign Y, the blue chrominance component is usually represented by sign Cb or U, and the red chrominance component is usually represented by sign Cr or V. Therefore, the video image may be represented in a YCbCr format, or a YUV format.

Related technical solutions will now be described for GPM.

In a hybrid video coding framework, a coding technology, such as prediction, transform, and quantization, is usually implemented only by taking a square or rectangular block as a unit. However, in practical applications, an edge of a moving object is not always horizontal or vertical, and even if it is, does not necessarily happen to be a block edge that may be partitioned. Since Motion Vectors (MVs) of two sides of a moving edge are often different, performing motion prediction and compensation with a whole block during coding easily generate a relatively big prediction error, further restricting the coding efficiency.

Figure 1:
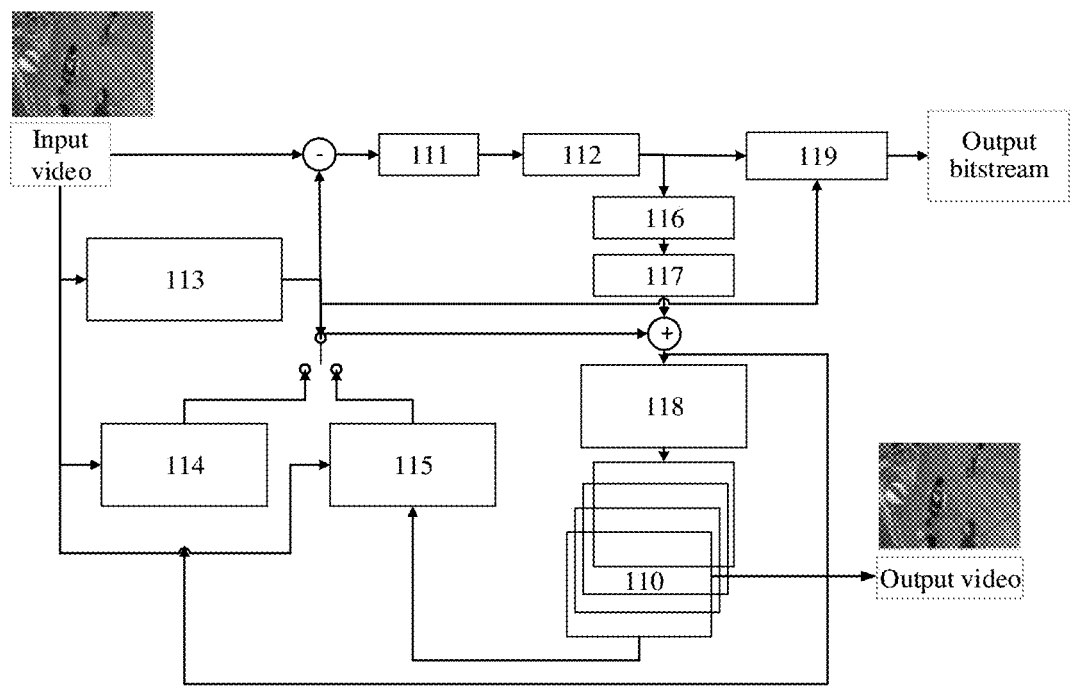
FIG. 1 is a composition block diagram of a video coding system according to an embodiment of the disclosure.

The application provides a video coding system. As shown in FIG. 1, the video coding system 11 includes: a transform unit 111, a quantization unit 112, a mode selection and coding control logic unit 113, an intra prediction unit 114, an inter prediction unit 115 (including motion compensation and motion estimation), an inverse quantization unit 116, an inverse transform unit 117, an in-loop filter unit 118, a coding unit 119, and a decoded image cache unit 110. For an input original video signal, a video reconstruction block may be obtained by division of a Coding Tree Unit (CTU). A coding mode is determined by the mode selection and coding control logic unit 113. Then, residual pixel information obtained by intra or inter prediction is processed by the transform unit 111 and the quantization unit 112 to transform the video reconstruction block, including transforming the residual information from a pixel domain to a transformation domain and quantizing an obtained transformation coefficient to further reduce a bit rate. The intra prediction unit 114 is configured to perform intra prediction on the video reconstruction block. The intra prediction unit 114 is configured to determine an optimal intra prediction mode (i.e., target prediction mode) for the video reconstruction block. The inter prediction unit 115 is configured to execute inter prediction coding on the received video reconstruction block relative to one or more blocks in one or more reference frames to provide time prediction information. Motion estimation is a process of generating an MV. A motion of the video reconstruction block may be estimated according to the MV. Then, motion compensation is executed based on the MV determined by motion estimation. After an inter prediction mode is determined, the inter prediction unit 115 is further configured to provide selected inter predicted data for the coding unit 119, and send MV data determined by calculation to the coding unit 119. In addition, the inverse quantization unit 116 and the inverse transform unit 117 are configured to reconstruct the video reconstruction block, namely a residual block is reconstructed in the pixel domain, an artifact with a blocking effect in the reconstructed residual block is removed through the in-loop filter unit 118, and then the reconstructed residual block is added to a predictive block in a frame of the decoded image cache unit 110 to generate a reconstructed video reconstruction block. The coding unit 119 is configured to code various coding parameters and quantized transformation coefficients. The decoded image cache unit 110 is configured to store the reconstructed video reconstruction block as a prediction reference. As video images are coded, new reconstructed video reconstruction blocks may be continuously generated, and all these reconstructed video reconstruction blocks may be stored in the decoded image cache unit 110.

Figure 2:
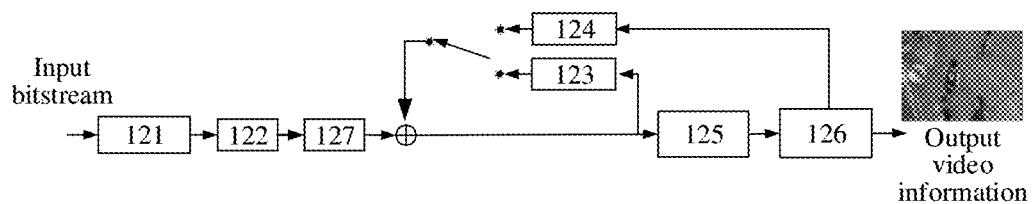
FIG. 2 is a composition block diagram of a video decoding system according to an embodiment of the disclosure.

An embodiment of the disclosure provides a video decoding system. FIG. 2 is a composition structure diagram of a video decoding system according to an embodiment of the disclosure. As shown in FIG. 2, the video decoding system 12 includes: a decoding unit 121, an inverse transform 127, an inverse quantization unit 122, an intra prediction unit 123, a motion compensation unit 124, an in-loop filter unit 125, and a decoded image cache unit 126.

After an input video signal is coded by the video coding system 11, a bitstream of the video signal is output. The bitstream is input to the video decoding system 12, and is processed by the decoding unit 121 first to obtain a decoded transformation coefficient. A residual block is generated in a pixel domain by processing of the inverse transform unit 127 and the inverse quantization unit 122 for the transformation coefficient. The intra prediction unit 123 may be configured to generate predicted data of a present video decoding block based on a determined intra prediction direction and data of a previous decoded block from a present frame or picture. The motion compensation unit 124 analyzes an MV and another associated syntactic element to determine prediction information for the video decoding block, and generates a predictive block of the video decoding block that is presently decoded by using the prediction information. The residual block from the inverse transform unit 127 and the inverse quantization unit 122 and the corresponding predictive block generated by the intra prediction unit 123 or the motion compensation unit 124 are summed to form a decoded video block. An artifact with a blocking effect in the decoded video signal may be removed through the in-loop filter unit 125 to improve the video quality. Then, the decoded video block is stored in the decoded image cache unit 126. The decoded image cache unit 126 stores a reference image for subsequent intra prediction or motion compensation, and is also configured to output a video signal, so as to obtain the recovered original video signal.

An inter prediction method provided in the embodiments of the application is mainly applied to the inter prediction unit 215 of the video coding system 11 and an inter prediction unit, i.e., the motion compensation unit 124, of the video decoding system 12. That is, if the video coding system 11 may achieve a relatively good prediction effect by the inter prediction method provided in the embodiments of the application, a decoder may correspondingly improve the video decoding recovery quality.

Based on this, the technical solutions of the application will further be described below in detail in combination with the drawings and the embodiments. Before detailed description, it is to be noted that "first", "second", "third", etc., mentioned throughout the specification are only for distinguishing different features and do not limit priorities, sequences, magnitude relationships, etc.

An embodiment of the disclosure provides an inter prediction method, which is applied to a video decoding device, i.e., a decoder. A function realized by the method may be realized by a first processor in the video decoding device by calling a program code. Certainly, the program code may be stored in a computer storage medium. It can be seen that the video decoding device at least includes the first processor and a first memory.

Figure 3:
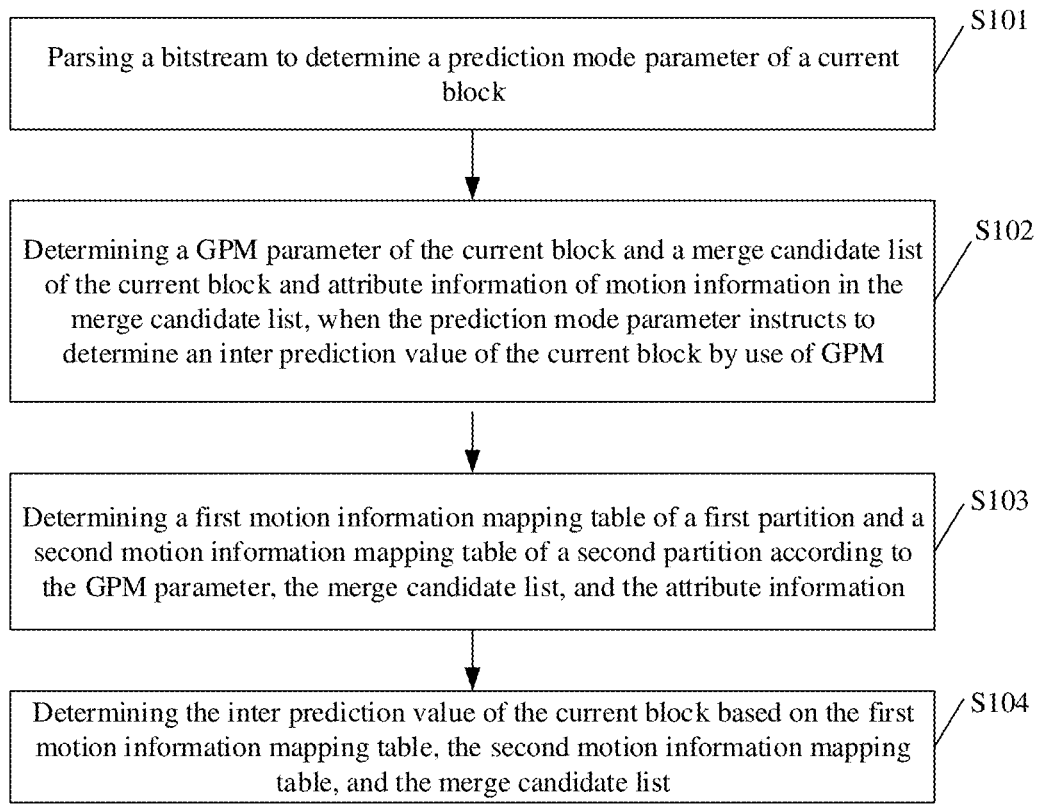
FIG. 3 is a first implementation flowchart of an intra prediction method according to an embodiment of the disclosure.

FIG. 3 is a flowchart of an inter prediction method according to an embodiment of the disclosure. The method is applied to a decoder. As shown in FIG. 3, the method includes the following operations.

In S101, a bitstream is parsed to determine a prediction mode parameter of a current block.

In the embodiment of the disclosure, a video image may be partitioned into multiple image blocks. Each image block presently to be decoded may be referred to as a decoding block. Each decoding block may include a first image component, a second image component, and a third image component. The current block is a decoding block whose first image component, second image component, or third image component is presently to be predicted in the video image.

If the first image component of the current block is to be predicted, and the first image component is a luminance component, namely an image component to be predicted is the luminance component, the current block may also be referred to as a luminance block. Alternatively, if the second image component of the current block is to be predicted, and the second image component is a chrominance component, namely an image component to be predicted is the chrominance component, the current block may also be referred to as a chrominance block.

It is also to be noted that the prediction mode parameter indicates a coding mode for the current block and a parameter related to the mode. an encoder may usually determine the prediction mode parameter of the current block by Rate Distortion Optimization (RDO). A decoder may parse the bitstream to directly obtain a GPM parameter.

In the embodiment of the disclosure, the decoder may parse the bitstream during decoding to obtain information about coding means used by the encoder during coding, i.e., a predictive decoding parameter for the current block. Based on the diversity of present coding modes, the decoder may decode various prediction modes. An inter prediction mode provided in the embodiment of the disclosure is a scenario implemented only when GPM is used for coding.

When the predictive decoding parameter obtained by the decoder by parsing the bitstream indicates to determine inter prediction of the current block by using GPM, the inter prediction mode provided in the embodiment of the disclosure is used to obtain information about the GPM parameter used for the current block during coding by parsing the bitstream. The GPM parameter includes a partition mode of the GPM and motion related information. Here, the GPM may include 64 partition modes.

In the embodiment of the disclosure, the decoder decodes a prediction mode for the current block. If the GPM is used for the current block, a partition mode of the GPM needs to be decoded. If the GPM uses a mask method, information about MVs for two partitions of the current block or other GPM related information is decoded.

In S102, a GPM parameter of the current block and a merge candidate list of the current block and attribute information of motion information in the merge candidate list is determined when the prediction mode parameter indicates to determine an inter prediction value of the current block by using GPM.

In the embodiment of the disclosure, the attribute information may include source information of the motion information. Descriptions are made in the embodiment of the disclosure taking the attribute information being motion information as an example. It is not restricted in the application that the inter prediction mode provided in the embodiment of the disclosure may still be used for implementation when the attribute information is other information.

In the embodiment of the disclosure, when the prediction mode parameter indicates to determine an inter prediction value of the current block by using GPM, a GPM parameter of the current block, a merge candidate list (merge candidate list) of the current block, and a source description, i.e., source information, of motion information stored in the merge candidate list are obtained at the same time. The source information represents a source block of the motion information.

It is to be noted that the merge candidate list includes multiple candidate MVs for motion prediction of the current block. The MV is a two-dimensional vector for inter prediction, and provides an offset from a coordinate in a decoded image to a coordinate in a reference image.

In the embodiment of the disclosure, inter prediction refers to indicating positions of pixels for prediction in a reference frame through MVs according to pixels in the reference frame of the current block to generate a predicted value of the current block. As a short-term reference image or frame or a long-term reference image or frame, the reference frame includes samples for inter prediction in a subsequent image decoding process according to a decoding sequence.

Figure 4A:
FIGS. 4A to 4B are two exemplary schematic partition diagrams of a Triangular Partition Mode (TPM) according to an embodiment of the disclosure.
Figure 4B:
Figure 5A:
FIGS. 5A to 5G are exemplary schematic diagrams of seven partition modes according to an embodiment of the disclosure.
Figure 5B:
Figure 5C:
Figure 5D:
Figure 5E:
Figure 5F:
Figure 5G:

During the establishment of a new-generation video coding standard H.266/Versatile Video Coding (VVC), division of other shapes except squares and rectangles is introduced. First, a TPM is introduced, as shown in FIGS. 4A and 4B. In FIGS. 4A and 4B, a diagonal or back-diagonal of a square or rectangle is used as a partitioning line to obtain a triangular prediction unit. Therefore, inter prediction data may be represented more flexibly, prediction errors are reduced, and the coding/decoding efficiency is further improved.

Inter Geometrical partitioning for inter blocks (GEO) more flexible than TPM was raised at a meeting of the Joint Video Experts Team (JVET), and the JVET formally introduced GEO into VVC and renamed it GPM later. Specifically, the GPM uses a more flexible representation method for an edge of a moving object in an image, partitions an inter block into two non-rectangular sub partitions, as shown in FIGS. 5A to 5G, and performs prediction and then weighted merging for the two partitioned sub partitions respectively, thereby obtain an inter prediction value of the current block.

In current VVC Draft8, the GPM includes totally 64 partition modes, each of which corresponds to an angle α and a stride ρ. There are totally 20 angles and 4 strides.

Figure 6:
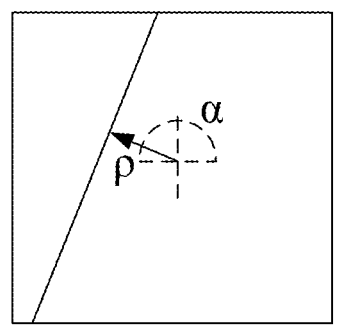
FIG. 6 is an exemplary schematic diagram of an angle and stride of a current block according to an embodiment of the disclosure.

Exemplarily, as shown in FIG. 6, each combination of an angle and a stride forms a partition mode. The GPM divides the current block into two non-rectangular sub partitions, performs unidirectional motion compensation on each sub partition separately to obtain a unidirectional predicted value, and finally performs weighted merging on the unidirectional predicted values of the two sub partitions by using a weight matrix to obtain a final GPM predicted value.

In the embodiment of the disclosure, when it is determined at a decoder side that inter prediction is used by using the GPM, the decoder may parse the bitstream to obtain the GPM parameter used when the encoder performs inter prediction on the current block by using the GPM.

Figure 7:
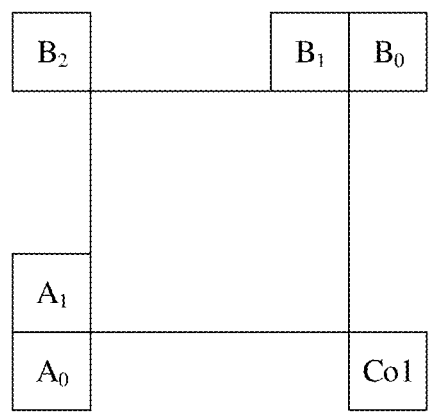
FIG. 7 is a schematic diagram of positions of neighbor blocks in a spatial merge candidate list according to an embodiment of the disclosure.

It is to be noted that the construction of the merge candidate list of the current block by the decoder by syntax parsing is the same as list construction in a general merge mode. FIG. 7 is a schematic diagram of positions of neighbor blocks in a spatial merge candidate list according to an embodiment of the disclosure. As shown in FIG. 7, the neighbor blocks in the merge candidate list are constructed according to the following sequence: a left neighbor block A1, a highest neighbor block B1, a top-right neighbor block B0, a bottom-left neighbor block A0, a top-left neighbor block B2, a corresponding position block col of a reference frame, MV information of the neighbor blocks being arranged sequentially and distinguished by different direction sources, then (not shown in the figure), a historical reference block his, an average MV avg of first and second candidate MVs, and a zero MV 0.

That is, the source information in the embodiment of the disclosure may be related information corresponding to A0, A1, B1, B0, B2, col, and his respectively, and avg and 0. Each piece of motion information stored in the merge candidate list corresponds to a source.

Exemplarily, unidirectional or bidirectional MV information of the five neighbor blocks in FIG. 7 is obtained, and the unidirectional or bidirectional MV information of each neighbor block is added to the merge candidate list according to an addition sequence of the neighbor blocks (source information A1-B1-B0-A0 (B2)) to form candidate items of the current block. B2 is a substitute. When at least one of the first four items is unavailable, the MV information of B2 needs to be added to the candidate list. The addition sequence of the neighbor blocks represents a correlation between each piece of MV information and MV information of the current block. That is, an addition sequence of the merge candidate list represents a probability that the MV information of the candidate item is selected as the MV information of the current block, and the accuracy after the MV information of the candidate item is selected as the MV information of the current block.

Figure 8:
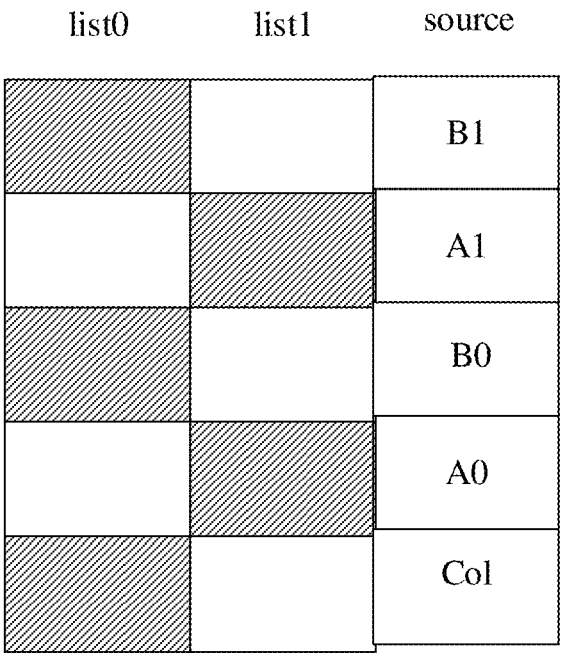
FIG. 8 is a composition structure diagram of a merge list according to an embodiment of the disclosure.

In the embodiment of the disclosure, FIG. 8 is a first composition structure diagram of a merge list according to an embodiment of the disclosure. The merge candidate list in FIG. 8 is obtained according to the schematic diagram of positions of neighbor blocks in FIG. 7. As shown in FIG. 8, the merge candidate list includes MV information of five neighbor blocks, corresponding to serial numbers 0, 1, 2, 3, and 4 respectively. Each neighbor block includes bidirectional prediction MV information, i.e., list0 and list1. The source information (source) obtained by the decoder may be arranged at source in the merge candidate list to represent a source block of the bidirectional MV corresponding to each serial number.

In S103, a first motion information mapping table of a first partition and a second motion information mapping table of a second partition are determined according to the GPM parameter, the merge candidate list, and the attribute information.

The decoder, after obtaining the GPM parameter, the merge candidate list, and the source information (attribute information), may partition the current block by using the GPM according to the GPM parameter to determine a first partition and a second partition, and then determine a first motion information mapping table and a second motion information mapping table based on the source information and the merge candidate list.

It is to be noted that the first motion information mapping table represents correspondences between indices of first candidate motion information corresponding to the first partition and motion indices in the merge candidate list, and the second motion information mapping table represents a correspondence between an index of second candidate motion information corresponding to the first partition and a motion index in the merge candidate list.

In the embodiment of the disclosure, the merge candidate list may include serial numbers (referred to as practical serial numbers herein) and MV information corresponding to the serial numbers. Each source in the source information corresponds to a serial number.

The decoder acquires the motion information mapping tables of the first partition and the second partition based on the constructed common merge candidate list and the source information. Here, the motion information mapping table does not store the motion information. Instead, sources of the partition are ranked based on the source information, and ranked serial numbers are obtained according to the ranked serial numbers. The motion information mapping table represents correspondences between the practical serial numbers and the ranked serial numbers.

That is, the first motion information mapping table stores correspondences between first ranked serial numbers determined for the first partition based on the source information and the practical serial numbers, and the second motion information mapping table stores correspondences between second ranked serial numbers determined for the second partition based on the source information and the practical serial numbers.

Exemplarily, the mapping table is as shown by Table 1.

TABLE 1

| Practical serial number | 0 | 1 | 2 | 3 | 4 |
| mergeMapA[ ] | 0 | 2 | 1 | 3 | 4 |
| mergeMapB[ ] | 1 | 3 | 4 | 2 | 0 | mergeMapA[ ] is the first ranked serial number, and mergeMapB[ ] is the second ranked serial number. The first motion information mapping table may be a mapping table formed by the first row and the second row. The second motion information mapping table may be a mapping table formed by the first row and the third row. A specific representation form of the mapping table is not limited in the embodiment of the disclosure.

In the embodiment of the disclosure, the first ranked serial number may be determined according to first ranked source information and third ranked source information, and the second ranked serial number may be determined according to second ranked source information and fourth ranked source information. The first ranked source information, the second ranked source information, the third ranked source information, and the fourth ranked source information will be described in the following embodiments.

That is, if first ranked source information or third ranked source information of partition A (the first partition) is B1→B0→A1→A0→Col, based on the description of FIG. 8, the first ranked source information or the third ranked source information is each item corresponding to serial numbers 0, 2, 1, 3, and 4 in the merge candidate list. In such case, the first ranked serial number (mergeMapA[ ]) is 0, 2, 1, 3, and 4. Similarly, if second ranked source information or fourth ranked source information of partition B (the second partition) is A1→A0→Col→B0→B1, based on the description of FIG. 8, the second ranked source information or the fourth ranked source information is items corresponding to serial numbers 1, 3, 4, 2, and 0 in the merge candidate list. In such case, the second ranked serial number (mergeMapB[ ]) is 1, 3, 4, 2, and 0. Based on this, a mapping relationship of Table 1 is obtained.

In the embodiment of the disclosure, mergeMapA[ ] is reranking of partition A (corresponding to the original merge candidate list), and mergeMapB[ ] is reranking of partition B (corresponding to the original merge candidate list).

In the embodiment of the disclosure, an implementation principle of the operation that the decoder determines a first motion information mapping table and a second motion information mapping table based on the source information and the merge candidate list is: optimizing a technology of acquiring MVs of the first partition and second partition obtained by the GPM, analyzing a present GPM, reusing a conventional merge candidate list, adding a source item during the construction of the conventional merge candidate list, marking a source peripheral block of each item, constructing mapping tables corresponding to merge candidate lists respectively for the two partitions obtained by the GPM during the construction of the unidirectional merge lists of the GPM, and then selecting corresponding motion information from the corresponding merge candidate lists based on the mapping tables.

It can be understood that, based on the same principle, when the encoder performs serial number transmission based on the mapping table, the practical serial number (1) that is practically transmitted is smaller than the ranked serial number (mergeMapA[ ] is 2) ranked in the front, whereby the bitstream is reduced.

In the embodiment of the disclosure, when the mapping table is constructed for each of the two partitions, a corresponding merge mapping table may be constructed according to an adjacency between each MV source and the partition.

In some embodiments of the application, the process that the decoder determines a first motion information mapping table and a second motion information mapping table based on the source information and the merge candidate list may be implemented in the following manners.

In the first manner, the decoder determines a first weight value set of target pixel positions of respective neighbor blocks neighboring to the first partition and a second weight value set of target pixel positions of respective neighbor blocks neighboring to the second partition based on the source information, determines the first motion information mapping table from the merge candidate list based on the first weight value set, and determines the second motion information mapping table from the merge candidate list based on the second weight value set.

In the embodiment of the disclosure, the process that the decoder determines the first motion information mapping table from the merge candidate list based on the first weight value set and determines the second motion information mapping table from the merge candidate list based on the second weight value set may be implemented as follows.

The decoder acquires a weight value of the first partition and a weight value of the second partition. The first weight value set is ranked based on the weight value of the first partition to obtain first ranked source information of respective neighbor blocks. A first merge motion information index consistent in ranking with the first ranked source information is determined from the merge candidate list. The merge motion information index is numbered sequentially to obtain an index of first candidate motion information, and a mapping relationship between the index of the first candidate motion information and the corresponding merge motion information index is determined as the first motion information mapping table. The second weight value set is ranked based on the weight value of the second partition to obtain second ranked source information of respective neighbor blocks. A second merge motion information index consistent in ranking with the second ranked source information is determined from the merge candidate list. The second merge motion information index is numbered sequentially to obtain an index of second candidate motion information, and a mapping relationship between the index of the second candidate motion information and the corresponding merge motion information index is determined as the second motion information mapping table.

In the embodiment of the disclosure, the decoder calculates a weight value wValue of a pixel position corresponding to a position of each source in the two partitions, then performs reranking according to a sequence from large to small wValue (from small to large serial numbers in the original merge candidate list if the wValue is the same or vectors his, avg, and 0 do not exist), and records a corresponding sequence (ranked serial numbers) in the mapping table.

In the embodiment of the disclosure, the decoder may obtain the first weight value set of the target pixel position of each neighbor block neighboring to the first partition and the second weight value set of the target pixel position of each neighbor block neighboring to the second partition according to a weight mask matrix, or may directly calculate the first weight value set and the second weight value set. A specific acquisition manner is not limited in the embodiment of the disclosure.

Here, the target pixel position is a pixel position corresponding to each neighbor block in the current block, and is within the current block.

It is to be noted that, if a weight value of a neighbor block is closer to that of the first partition, it indicates that the neighbor block belongs to the first partition at a higher probability, namely the closeness is higher. If a weight value of a neighbor block is closer to that of the second partition, it indicates that the neighbor block belongs to the second partition at a higher probability, namely the closeness is higher. If a neighbor block is closer to a partition, the neighbor block is ranked closer to the front, or understood as having a higher priority.

Figure 9:
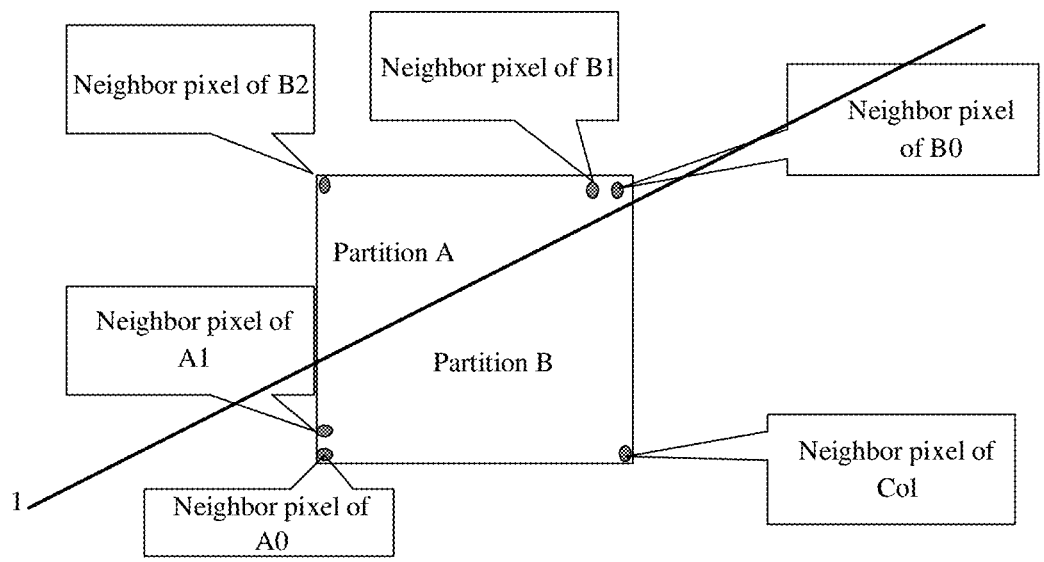
FIG. 9 is a first exemplary schematic diagram of block partitioning according to an embodiment of the disclosure.

Exemplarily, as shown in FIG. 9, when GPM-based prediction is performed on the current block using a partitioning line shown in FIG. 9, the first partition is partition A, and the second partition is partition B. In such case, each neighbor block includes A0, A1, B1, B0, B2, and col. Corresponding to the partitioning line 1 in FIG. 9, for partition A, a weight value corresponding to a neighbor pixel (xCb, yCb) (i.e., a top-left pixel of the current block) of B2 is 8, a weight value corresponding to a neighbor pixel (xCb+nW−2, yCb) of B1 is 7, a weight value corresponding to a neighbor pixel (xCb+nW−1, yCb) of B0 is 6, a weight value corresponding to a neighbor pixel (xCb, yCb+nH−2) of A1 is 0, a weight value corresponding to a neighbor pixel (xCb, yCb+nH−1) of A0 is 0, and a weight value corresponding to a neighbor pixel (xCb+nW−1, yCb+nH−1) of Col is 0. In such case, the first ranked source information of partition A is correspondingly B2→B1→B0→A1→A0→Col→his→avg→0, where his, avg, and 0 are ignorable if not existing. Considering the symmetry of the weight values of partition B and partition A, a weight value corresponding to the neighbor pixel (xCb, yCb) of B2 is 0, a weight value corresponding to the neighbor pixel (xCb+nW−2, yCb) of B1 is 1, a weight value corresponding to the neighbor pixel (xCb+nW−1, yCb) of B0 is 2, a weight value corresponding to the neighbor pixel (xCb, yCb+nH−2) of A1 is 8, a weight value corresponding to the neighbor pixel (xCb, yCb+nH−1) of A0 is 8, and a weight value corresponding to the neighbor pixel (xCb+nW−1, yCb+nH−1) of Col is 8. Clearly, the second ranked source information of partition B is correspondingly A1→A0→Col→B0→B1→B2→his→avg→0, where his, avg, and 0 are ignorable if not existing.

In combination with FIGS. 8 and 9, there is optionally B1→B0→A1→A0→Col for partition A, corresponding to the first ranked serial numbers 0, 2, 1, 3, and 4 in the original merge candidate list, and there is optionally A1→A0→Col→B0→B1 for partition B, corresponding to the serial numbers 1, 3, 4, 2, and 0 in the original merge candidate list. Then, the decoder may construct a first motion information candidate list corresponding to the first partition based on the sequence of 0, 2, 1, 3, and 4 and the merge candidate list, and construct a second motion information candidate list corresponding to the second partition based on the sequence of 1, 3, 4, 2, and 0 and the merge candidate list, thereby performing subsequent prediction by using the first motion information candidate list and the second motion information candidate list. Alternatively, a position of a transmitted practical serial number in a re-ranked candidate list is found directly based on the first motion information mapping table, then a content of a specific item is selected from the merge candidate list, a position of the transmitted practical serial number in a re-ranked candidate list is found directly based on the second motion information mapping table, a content of a specific item is selected from the merge candidate list, and then inter prediction is performed. The above-mentioned implementation mode is not limited in the embodiment of the disclosure.

In some embodiments of the application, the target pixel positions are at least two pixel positions neighboring to the neighbor block in the current block. That is, when a weight value of a neighbor block is obtained according to weight values (weighted averages, mean square errors, etc.) of multiple pixel positions connected therewith in the current block, the process that the decoder determines a first weight value set of target pixel positions of respective neighbor blocks neighboring to the first partition and a second weight value set of target pixel positions of respective neighbor blocks neighboring to the second partition based on the source information is implemented by the following operations. Each neighbor block neighboring to the first partition and the second partition is determined based on the source information. First weight value averages corresponding to respective neighbor blocks neighboring to the first partition for the at least two pixel positions is determined to obtain the first weight value set of respective neighbor blocks, the first weight value set comprising the first weight value averages corresponding to respective neighbor blocks. Second weight value averages corresponding to respective neighbor blocks neighboring to the second partition for the at least two pixel positions is determined to obtain the second weight value set of respective neighbor blocks, the second weight value set comprising the second weight value averages corresponding to respective neighbor blocks.

That is, a corresponding representative neighbor pixel (multiple neighbor pixels may be used) of each neighbor block in the current block is selected in another manner After a weight value mask matrix corresponding to partition A of the current block is acquired, weight values of neighbor pixels of each candidate in the merge candidate list are summed and averaged. The candidate corresponding to a maximum average is preferentially used to acquire the MV of partition A, and the candidate corresponding to a minimum average is preferentially used to acquire the MV of partition B.

Figure 10:
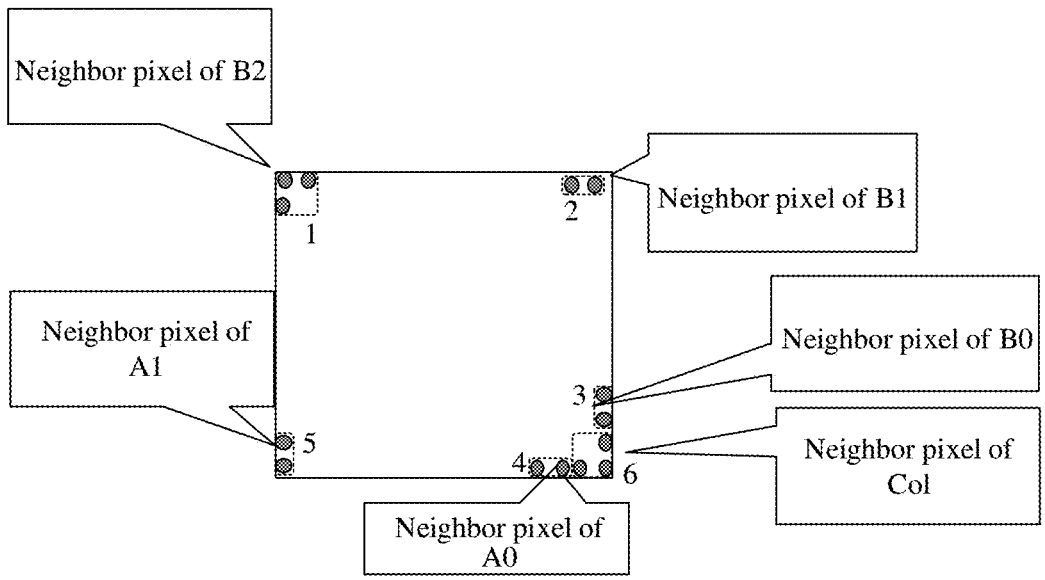
FIG. 10 is a second exemplary schematic diagram of block partitioning according to an embodiment of the disclosure.

Exemplarily, as shown in FIG. 10, a target pixel of B2 may be a pixel shown in region 1, a target pixel of B1 may be a pixel shown in region 2, a target pixel of B0 may be a pixel shown in region 3, a target pixel A0 may be a pixel shown in region 4, a target pixel of A1 may be a pixel shown in region 5, and a target pixel of col may be a pixel shown in region 6.

It is to be noted that the target pixel position is selected as long as being neighboring to the neighbor block, and is not limited in number and position in the embodiment of the disclosure.

In the second manner, the decoder determines a first distance set between respective neighbor blocks neighboring to the first partition and a partitioning line and a second distance set between respective neighbor blocks neighboring to the second partition and the partitioning line based on the source information, determines the first motion information mapping table from the merge candidate list based on the first distance set, and determines the second motion information mapping table from the merge candidate list based on the second distance set.

In the embodiment of the disclosure, the decoder determines the first motion information mapping table from the merge candidate list based on the first distance set, and determines the second motion information mapping table from the merge candidate list based on the second distance set. In the embodiment of the disclosure, the decoder sequences the first distance set to obtain third ranked source information of respective neighbor blocks. A first merge motion information index consistent in ranking with the third ranked source information is determined from the merge candidate list. The merge motion information index is numbered sequentially to obtain an index of first candidate motion information, and a mapping relationship between the index of the first candidate motion information and the corresponding merge motion information index is determined as the first motion information mapping table. The second distance set is ranked to obtain fourth ranked source information of respective neighbor blocks. A second merge motion information index consistent in ranking with the fourth ranked source information is determined from the merge candidate list. The second merge motion information index is numbered sequentially to obtain an index of second candidate motion information, and a mapping relationship between the index of the second candidate motion information and the corresponding merge motion information index is determined as the second motion information mapping table.

In some embodiments of the application, the process that the decoder determines a first distance set between respective neighbor blocks neighboring to the first partition and a partitioning line and a second distance set between respective neighbor blocks neighboring to the second partition and the partitioning line based on the source information may include manner A and manner B as follows.

In manner A, the decoder determines each neighbor block neighboring to the first partition and the second partition based on the source information, determines a first neighbor pixel position of the current block corresponding to each neighbor block, determines the first distance set, in the first partition, between the first neighbor pixel positions and the partitioning line, and determines the second distance set, in the second partition, between the first neighbor pixel positions and the partitioning line.

In manner B, the decoder determines each neighbor block neighboring to the first partition and the second partition based on the source information, determines a first pixel position corresponding to each neighbor block, determines the first distance set, in the first partition, between the first pixel position and the partitioning line, and determines the second distance set between the first pixel positions in the second partition and the partitioning line.

In the embodiment of the disclosure, the first neighbor pixel position is a pixel position neighboring to the neighbor block in the current block. The first pixel position is a pixel position representing the neighbor block in the neighbor block.

In the embodiment of the disclosure, a distance is calculated based on the same principle of calculating a weight, or may be obtained by other mathematical methods. No limits are made in the embodiment of the disclosure.

It is to be noted that, in the first partition, if a distance between a neighbor block and the partitioning line is longer, it indicates that the neighbor block belongs to the first partition at a higher probability, namely the closeness is higher. In the second partition, if a distance between a neighbor block and the partitioning line is longer, it indicates that the neighbor block belongs to the second partition at a higher probability, namely the closeness is higher. If a neighbor block is closer to a partition, the neighbor block is ranked closer to the front, or understood as having a higher priority.

Exemplarily, when the decoder determines the mapping tables based on distance information and calculates distances based on neighbor pixel positions, corresponding to the partitioning line shown in FIG. 9, for partition A, a pixel distance corresponding to a neighbor pixel (xCb, yCb) of B2 in the current block is greater than 32, a distance corresponding to a neighbor pixel (xCb+nW−2, yCb) of B1 is about 28, a distance corresponding to a neighbor pixel (xCb+nW−1, yCb) of B0 is about 24, a distance corresponding to a neighbor pixel (xCb, yCb+nH−2) of A1 is less than −32, a distance corresponding to a neighbor pixel (xCb, yCb+nH−1) of A0 is less than −32, and a distance corresponding to a neighbor pixel (xCb+nW−1, yCb+nH−1) of Col is less than −32. In such case, the third ranked source information of partition A is correspondingly B2→B1→B0→A1→A0→Col→his→avg→0, where his, avg, and 0 are ignorable if not existing. Considering the symmetry of the weight values of partition B and partition A, a distance corresponding to the neighbor pixel (xCb, yCb) of B2 is less than −32, a distance corresponding to the neighbor pixel (xCb+nW−2, yCb) of B1 is about 4, a distance corresponding to the neighbor pixel (xCb+nW−1, yCb) of B0 is about 8, a distance corresponding to the neighbor pixel (xCb, yCb+nH−2) of A1 is greater than 32, a distance corresponding to the neighbor pixel (xCb, yCb+nH−1) of A0 is greater than 32, and a distance corresponding to the neighbor pixel (xCb+nW−1, yCb+nH−1) of Col is greater than 32. Clearly, the fourth ranked source information of partition B is correspondingly A1→A0→Col→B0→B1→B24his→avg→0, where his, avg, and 0 are ignorable if not existing.

In combination with FIGS. 8 and 9, there is optionally B1→B0→A1→A0→Col for partition A, corresponding to the first ranked serial numbers 0, 2, 1, 3, and 4 in the original merge candidate list, and there is optionally A1→A0→Col→B0→B1 for partition B, corresponding to the serial numbers 1, 3, 4, 2, and 0 in the original merge candidate list. Then, the decoder may construct a first motion information candidate list corresponding to the first partition based on the sequence of 0, 2, 1, 3, and 4 and the merge candidate list, and construct a second motion information candidate list corresponding to the second partition based on the sequence of 1, 3, 4, 2, and 0 and the merge candidate list, thereby performing subsequent prediction by using the first motion information candidate list and the second motion information candidate list. Alternatively, a position of a transmitted practical serial number in a re-ranked candidate list is found directly based on the first motion information mapping table, then a content of a specific item is selected from the merge candidate list, a position of the transmitted practical serial number in a re-ranked candidate list is found directly based on the second motion information mapping table, a content of a specific item is selected from the merge candidate list, and then inter prediction is performed. The above-mentioned implementation mode is not limited in the embodiment of the disclosure.

In S104, the inter prediction value of the current block is determined based on the first motion information mapping table, the second motion information mapping table, and the merge candidate list.

The decoder, after obtaining the first motion information mapping table and the second motion information mapping table, may determine first motion information of the first partition based on the merge candidate list and the first motion information mapping table, and determine second motion information corresponding to the second partition based on the merge candidate list and the second motion information mapping table. Then, unidirectional prediction is performed on the first partition according to the first motion information, and unidirectional prediction is performed on the second partition based on the second motion information. The inter prediction value of the current block is determined based on weighted processing of a first predicted value and a second predicted value.

It can be understood that, during GPM-based prediction, the motion information mapping tables corresponding to the partitioned first partition and second partition may be constructed respectively, so that respective best motion information may be obtained from the merge candidate list based on the motion information mapping tables to predict the current block. As such, motion information candidates are constructed for the two partitions partitioned by using the GPM respectively, and are used for different partitions respectively. Therefore, constructing respective merge mapping tables for different partitions improves the accuracy of selecting motion information for each partition, and further improves an inter prediction effect.

In some embodiments of the application, when the decoder determines the inter prediction value of the current block based on the first motion information mapping table, the second motion information mapping table, and the merge candidate list, the first motion information and the second motion information are acquired by: initializing a motion information candidate list of the current block respectively based on the first motion information mapping table and the second motion information mapping table, and sequentially acquiring the first motion information from the merge candidate list according to a preset acquisition strategy, the acquisition strategy being determined by a construction sequence (ranked serial numbers) of neighbor blocks in the merge candidate list and reference list indication information, and the reference list indication information being used to indicate usage priorities of MV information of a first reference list and MV information of a second reference list. Specifically, the decoder sequentially acquires the first motion information in the merge candidate list according to the construction sequence of the neighbor blocks in the merge candidate list and the reference list indication information, the reference list indication information being used to indicate preferentially used motion information of the first reference list or preferentially used motion information of the second reference list.

In the embodiment of the disclosure, Table 2 shows a coding syntax parsed by the decoder.

TABLE 2

|  | Descriptor |
| --- | --- |
| merge_data(x0,y0,cbWidth,cbHeight, cbType) { | |
| ...... | |
| merge_gpm_partition_idx[x0][y0] | ae(v) |
| merge_gpm_idx0[x0][y0] | ae(v) |
| if( MaxNumGpmMergeCand > 2 ) | |
| merge_gpm_idx1[x0][y0] | ae(v) |
| ......} | |

Here, merge_gpm_idx0[x0][y0] represents a position of an MV of partition A (the first partition) in a re-ranked merge list of partition A. There is set m=merge_gpm_idx0[xCb][yCb] for subsequent processing.

merge_gpm_idx1[x0][y0] represents a position of an MV of partition B (the second partition) in the merge list. There is set n=merge_gpm_idx1[xCb][yCb], where n represents a practical position of the MV selected for partition B in a reranked merge candidate list of partition B.

There is set M=mergeCandList[mergeMapA[m]]. An item corresponding to a serial number corresponding to an mth item in an mth mergeMapA is selected from the merge list for MV construction of partition A.

In a geometrical prediction block, only a unidirectional prediction mode is used for each partition. However, each item in the merge list may be bidirectional prediction MV information. Therefore, unidirectional prediction MVs need to be extracted for use. There is set X=(m&0x01) or X=(mergeMapA[m]&0x01), where & represents a bitwise AND operation. That is, a last bit of m is extracted (similar to parity check), list0 is selected if the last bit is 0, and list1 is selected if the last bit is 1. In this manner, MV information predFlagLXM corresponding to a reference frame in a reference list corresponding to X is preferentially used for partition prediction, such as options corresponding to the slashed regions in FIG. 8. If the corresponding MV is unavailable (the MV of the neighbor block may be unidirectional), the opposite MV (MV represented by the white block (blank region) horizontally corresponding to the blue block) is used, X=1–X.

After completing prediction, the decoder stores the corresponding MV information as a processing variable of partition A for subsequent prediction block construction. The syntax is as follows.

mvA[0]=mvLXM[0]
mvA[1]=mvLXM[1]
refIdxA=refIdxLXM
predListFlagA=X mvA represents an MV, refIdxA represents a reference frame corresponding to the MV, and predListFlagA represents a list which corresponds to the MV option and where a component is selected presently.

Similarly, there is set N=mergeCandList[mergeMapB[n]]. An item corresponding to a serial number corresponding to an nth item in an nth mergeMapB is selected from the merge list for MV construction of partition B.

A unidirectional MV of the nth item is used for mvB construction. The MV corresponding to the slashed region in FIG. 8 is preferentially used, and if it is unavailable, the opposite MV is used. Therefore, there is set X=(mergeMapA[n]&0x01) or X=(n&0x01). If predFlagLXN is unavailable, X=1–X.

After completing prediction, the decoder stores the corresponding MV information as a processing variable of partition B for subsequent prediction block construction.

mvB[0]=mvLXN[0]
mvB[1]=mvLXN[1]
refIdxB=refIdxLXN
predListFlagB=X mvB represents an MV, refIdxB represents a reference frame corresponding to the MV, and predListFlagB represents a list which corresponds to the MV option and where a component is selected presently.

In some embodiments of the application, after S102, the inter prediction method provided in the embodiment of the disclosure further includes the following operations.

In S105, the second motion information mapping table of the second partition is constructed based on source information and the merge candidate list.

In S106, the inter prediction value of the current block is determined based on the second motion information mapping table and the merge candidate list.

In the embodiment of the disclosure, the decoder may perform reranking for only one partition to construct a mapping table. That is, the decoder may construct the mapping table of the first partition only, and confirm the motion information for the second partition still by using the merge candidate list. Alternatively, only the mapping table of the second partition is constructed, and the motion information is confirmed for the first partition still by using the merge candidate list.

Descriptions are made herein by taking the condition that the decoder constructs the mapping table of the second partition and confirms the motion information for the first partition still by using the merge candidate list as an example.

The decoder may construct the second motion information mapping table of the second partition based on the source information and the merge candidate list. A specific construction manner is the same as the manner and principle of implementing the second motion information mapping table in the above-mentioned embodiment, and will not be elaborated herein. Then, the decoder determines a second predicted value of the second partition based on the second motion information mapping table and the merge candidate list. The decoder determines a first predicted value of the first partition by using the merge candidate list, and determines the inter prediction value of the current block based on the weighted merging of the first predicted value and the second predicted value.

Exemplarily, the decoder, when constructing the merge list of the GPM, uses an existing merge candidate list for partition A, while perform merge list re-ranking for partition B. Weight values of neighbor pixels of each candidate in the merge candidate list corresponding to partition B are summed and averaged (in the manner shown in FIG. 10). Alternatively, the merge candidate list is reranked directly according to the weight values (in the manner shown in FIG. 9), namely according to a sequence from large to small weight values (to obtain the mapping table). In such case, it is necessary to add source information of each candidate to the merge list to determine the mapping table.

It can be understood that the decoder may implement reconstructed mapping tables of part of partitions, whereby the processing complexity is reduced, and the motion information selection accuracy is also improved.

In some embodiments of the application, the attribute information includes source information. The GPM parameter decoded by the decoder includes a first target motion information index. The first target motion information index is a position in the first motion information mapping table. An implementation process of S103 may further include the following operations.

In S1031, the first motion information mapping table is determined from the merge candidate list based on the source information.

In S1032, first motion information of the first partition is determined from the merge candidate list based on the first target motion information index and the first motion information mapping table.

In S1033, the first motion information is deduplicated from the merge candidate list to obtain a deduplicated merge candidate list.

In S1034, the second motion information mapping table is determined from the deduplicated merge candidate list based on the source information.

In the embodiment of the disclosure, the decoder, after selecting the MV for the first partition, deletes the selected MV, and then constructs the second motion information mapping table of the second partition by using the merge list that the MV is deleted from. That is, the decoder determines the first motion information mapping table from the merge candidate list based on the source information, determines first motion information of the first partition from the merge candidate list based on the first target motion information index and the first motion information mapping table, reduplicates the first motion information from the merge candidate list to obtain a deduplicated merge candidate list, and determines the second motion information mapping table from the deduplicated merge candidate list based on the source information.

Exemplarily, after an MV is selected for partition A, a source candidate of the MV is selected from the reranked merge list, and then the mapping table corresponding to partition B is constructed. For example, if the B1 candidate is selected for partition A, the B1 candidate is deleted during MV selection of partition B, and then a rearranged motion information mapping table (such as A1-A0-B0-col-B2-his-avg-0) is obtained according to the weight value or distance information of partition B. During MV selection of partition B, the merge list is reranked such that the A1 candidate in merge is selected for partition B as preferentially as possible.

In some embodiments of the application, an implementation process of S104 may further include the following operations.

In S1041, first motion information with a highest priority is determined from the merge candidate list based on the first motion information mapping table.

In S1042, second motion information with a highest priority is determined from the merge candidate list based on the second motion information mapping table.

In S1043, the inter prediction value of the current block is determined based on the first motion information and the second motion information.

In the embodiment of the disclosure, the decoder may directly find first motion information corresponding to a practical serial number with a highest priority after obtaining the first motion information mapping table, directly find second motion information corresponding to a practical serial number with a highest priority after obtaining the second motion information mapping table, and determine the inter prediction value of the current block based on the first motion information and the second motion information.

In some embodiments of the application, the decoder calculates a first predicted value of the first partition by using the first motion information, calculates a second predicted value of the second partition by using the second motion information, and performs weighted merging on the first predicted value and the second predicted value to obtain the inter prediction value of the current block.

It can be understood that the decoder directly uses the MV ranked at the first place from the merge candidate list based on the mapping table after reranking the motion information mapping tables for the two partitions respectively. That is, the encoder needs not to transmit a motion information index for coding, i.e., the practical serial number.

It is to be noted that, in the embodiment of the disclosure, the decoder may also transmit a practical serial number of one partition, select a ranked serial number in the mapping table based on the practical serial number, and selects the motion information from the merge candidate list based on the ranked serial number. For the other partition, motion information with a highest priority is directly selected for inter prediction. No limits are made in the embodiment of the disclosure.

In some embodiments of the application, the operation that the decoder directly uses the MV ranked at the first place from the merge candidate list based on the mapping table after reranking the motion information mapping tables for the two partitions respectively may further be implemented as follows. After ranking the first weight value set based on a weight value of the first partition to obtain first ranked source information of respective neighbor blocks and ranking the second weight value set based on a weight value of the second partition to obtain second ranked source information of respective neighbor blocks, the decoder determines first motion information corresponding to a highest ranking priority in the first ranked source information from the merge candidate list, determines second motion information corresponding to a highest ranking priority in the second ranked source information from the merge candidate list, and determines the inter prediction value of the current block based on the first motion information and the second motion information.

Alternatively, after ranking the first distance set to obtain the third ranked source information of respective neighbor blocks and ranking the second distance set to obtain the fourth ranked source information of respective neighbor blocks, the decoder determines first motion information corresponding to a highest ranking priority in the third ranked source information from the merge candidate list, determines second motion information corresponding to a highest ranking priority in the fourth ranked source information from the merge candidate list, and determines the inter prediction value of the current block based on the first motion information and the second motion information.

In the embodiment of the disclosure, not all options but only the most possible option needs to be constructed.

In the embodiment of the disclosure, the MV ranked at the first place is directly used after the merge candidate lists are reranked for the two partitions respectively. The coding syntax is modified as follows.

Table 3 shows a coding unit (CU) syntax.

TABLE 3

| | Descriptor |
|---|---|
| merge_data(x0,y0,cbWidth,cbHeight, cbType) { | |
| ...... | |
| merge_gpm_partition_idx[x0][y0] | ae(v) |
| ~~merge_gpm_idx0[x0][y0]~~ | ae(v) |
| ~~if( MaxNumGpmMergCand > 2 )~~ | |
| ~~merge_gpm_idx1[x0][y0]~~ | ae(v) |
| ......} | |

It can be understood that such an implementation mode omits the transmission of practical serial numbers, improves the encoder efficiency, and reduces the transmitted bitstream.

In some embodiments of the application, after S101 and before S104, the method further includes the following operations.

In S107, a GPM parameter of the current block and a reconstructed motion information mapping table of a first partition and a reconstructed motion information mapping table of a second partition is determined when the prediction mode parameter indicates to determine the inter prediction value of the current block by using GPM.

In S108, a present GPM is determined according to the GPM parameter of the current block.

In S109, a first motion information mapping table corresponding to the present GPM is determined from the reconstructed motion information mapping table of the first partition.

In S110, a second motion information mapping table corresponding to the present GPM is determined from the reconstructed motion information mapping table of the second partition.

In the embodiment of the disclosure, the decoder, before executing an editor, may determine and calculate reconstructed motion information mapping tables of the first partition and reconstructed motion information mapping tables of the second partition under different modes and sizes first according to all partition modes of the GPM and all block sizes. A specific calculation manner is the same as that in the above-mentioned embodiment. Then, when the prediction mode parameter indicates to determine the inter prediction value of the current block by using GPM, a GPM parameter of the current block is determined, and a reconstructed motion information mapping table of the first partition and a reconstructed motion information mapping table of the second partition are acquired. Later on, the decoder may determine a present GPM according to the GPM parameter of the current block, determine a first motion information mapping table corresponding to the present GPM from the reconstructed motion information mapping table of the first partition, and determine a second motion information mapping table corresponding to the present GPM from the reconstructed motion information mapping table of the second partition.

In some embodiments of the application, after S101, the method further includes the following operations.

In S111, a GPM parameter of the current block and source information of a neighbor block of the current block and motion information corresponding to attribute information is determined when the prediction mode parameter indicates to determine an inter prediction value of the current block by using GPM.

In S112, a first motion information candidate list and a second motion information candidate list are constructed respectively based on the attribute information of the neighbor block of the current block and the motion information corresponding to the attribute information.

In S113, the inter prediction value of the current block is determined based on the first motion information candidate list and the second motion information candidate list.

In the embodiment of the disclosure, the attribute information includes the source information.

In the embodiment of the disclosure, during decoding of the decoder, when the prediction mode parameter indicates to determine the inter prediction value of the current block by using GPM, the decoder may acquire source information of a neighbor block of the current block and motion information corresponding to the source information to directly construct a first motion information candidate list and a second motion information candidate list. The first motion information candidate list is obtained by ranking the motion information corresponding to the source information according to the first ranked source information or third ranked source information obtained in the above-mentioned embodiment. The second motion information candidate list is obtained by ranking the motion information corresponding to the source information according to the second ranked source information or fourth ranked source information obtained in the above-mentioned embodiment.

In the embodiment of the disclosure, the decoder may construct the first motion information candidate list and the second motion information candidate list respectively based on the source information of the neighbor block of the current block and the motion information corresponding to the source information, and determine the inter prediction value of the current block based on the first motion information candidate list and the second motion information candidate list. The first motion information candidate list and the second motion information candidate list are directly calculated independent of an alternative merge candidate list.

An embodiment of the disclosure provides an inter prediction method, which is applied to a video coding device, i.e., an encoder. A function realized by the method may be realized by a second processor in the video coding device by calling a program code. Certainly, the program code may be stored in a second memory. It can be seen that the video coding device at least includes the second processor and the second memory.

Figure 11:
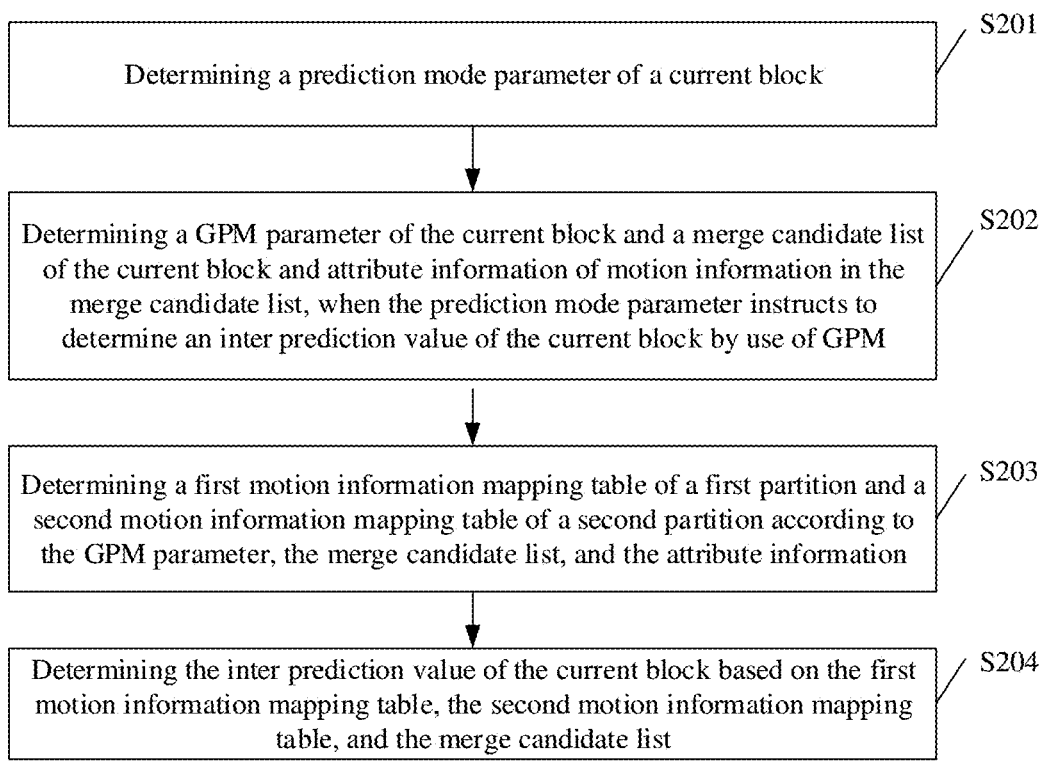
FIG. 11 is an implementation flowchart of an intra prediction method according to an embodiment of the disclosure.

FIG. 11 is an implementation flowchart of an inter prediction method according to an embodiment of the disclosure. As shown in FIG. 11, the method includes the following operations.

In S201, a prediction mode parameter of a current block is determined.

In the embodiment of the disclosure, a video image may be partitioned into multiple image blocks. Each image block presently to be coded may be referred to as a Coding Block (CB). Each CB may include a first image component, a second image component, and a third image component. The current block is a CB whose first image component, second image component, or third image component is presently to be predicted in the video image.

If the first image component of the current block is to be predicted, and the first image component is a luminance component, namely an image component to be predicted is the luminance component, the current block may also be referred to as a luminance block. Alternatively, if the second image component of the current block is to be predicted, and the second image component is a chrominance component, namely an image component to be predicted is the chrominance component, the current block may also be referred to as a chrominance block.

It is also to be noted that the prediction mode parameter indicates a coding mode for the current block and a parameter related to the mode. The prediction mode parameter of the current block may usually be determined by Rate Distortion Optimization (RDO).

Specifically, in some embodiments, the operation that the encoder determines a prediction mode parameter of a current block is implemented by the following operations. The encoder determines an image component to be predicted of the current block. Predictive coding is performed on the image component to be predicted by using multiple prediction modes respectively based on a parameter of the current block, and a rate distortion cost result corresponding to each of the multiple prediction modes is calculated. The minimum rate distortion cost result is selected from the calculated multiple rate distortion cost results, and the prediction mode corresponding to the minimum rate distortion cost result is determined as the prediction mode parameter of the current block.

That is, at an encoder side, for the current block, the image component to be predicted may be coded by using multiple prediction modes respectively. Here, the multiple prediction modes usually include an inter prediction mode, a conventional intra prediction mode, and an unconventional intra prediction mode. The conventional intra prediction mode may further include a Direct Current (DC) mode, a planar mode, an angular mode, etc. The unconventional intra prediction mode may further include a Matrix-based Intra Prediction (MIP) mode, a Cross-Component Linear Model Prediction (CCLM) mode, an Intra Block Copy (IBC) mode, a Palette (PLT) mode, etc. The inter prediction mode may include GPM, TPM, etc.

Then, after the current block is coded by using the multiple prediction modes, the rate distortion cost result corresponding to each prediction mode may be obtained. Then, the minimum rate distortion cost result is selected from the obtained multiple rate distortion cost results, and the prediction mode corresponding to the minimum rate distortion cost result is determined as the prediction mode parameter of the current block. As such, the current block may finally be coded by using the determined prediction mode. In this prediction mode, the prediction residual is small, and the coding efficiency may be improved.

It is to be noted that the encoder implements rate distortion cost calculation by using the prediction method provided in the embodiment of the disclosure, and elaborations are omitted herein.

In S202, a GPM parameter of the current block and a merge candidate list of the current block and attribute information of motion information in the merge candidate list is determined when the prediction mode parameter indicates to determine an inter prediction value of the current block by using GPM.

In S203, a first motion information mapping table of a first partition and a second motion information mapping table of a second partition are determined according to the GPM parameter, the merge candidate list, and the attribute information.

In some embodiments of the application, the first motion information mapping table represents correspondences between indices of first candidate motion information corresponding to the first partition and motion indices in the merge candidate list, and the second motion information mapping table represents a correspondence between an index of second candidate motion information corresponding to the first partition and a motion index in the merge candidate list.

In some embodiments of the application, the attribute information includes source information. The encoder divides the current block by using the GPM according to the GPM parameter to determine a first partition and a second partition, writes the GPM parameter to a bitstream, and determines a first motion information mapping table and a second motion information mapping table based on the source information and the merge candidate list.

In some embodiments of the application, the process that the encoder determines a first motion information mapping table and a second motion information mapping table based on the source information and the merge candidate list may be implemented in the following manners.

In the first manner, a first weight value set of target pixel positions of respective neighbor blocks neighboring to the first partition and a second weight value set of target pixel positions of respective neighbor blocks neighboring to the second partition are determined based on the source information. The first motion information mapping table is determined from the merge candidate list based on the first weight value set. The second motion information mapping table is determined from the merge candidate list based on the second weight value set.

In the embodiment of the disclosure, the process that the decoder determines the first motion information mapping table from the merge candidate list based on the first weight value set and determines the second motion information mapping table from the merge candidate list based on the second weight value set may be implemented as follows.

The encoder acquires a weight value of the first partition and a weight value of the second partition. The first weight value set is ranked based on the weight value of the first partition to obtain first ranked source information of respective neighbor blocks. A first merge motion information index consistent in ranking with the first ranked source information is determined from the merge candidate list. The merge motion information index is numbered sequentially to obtain an index of first candidate motion information, and a mapping relationship between the index of the first candidate motion information and the corresponding merge motion information index is determined as the first motion information mapping table. The second weight value set is ranked based on the weight value of the second partition to obtain second ranked source information of respective neighbor blocks. A second merge motion information index consistent in ranking with the second ranked source information is determined from the merge candidate list. The second merge motion information index is numbered sequentially to obtain an index of second candidate motion information, and a mapping relationship between the index of the second candidate motion information and the corresponding merge motion information index is determined as the second motion information mapping table.

In some embodiments of the application, the target pixel positions are at least two pixel positions neighboring to the neighbor block in the current block.

The process that the encoder determines a first weight value set of target pixel positions of respective neighbor blocks neighboring to the first partition and a second weight value set of target pixel positions of respective neighbor blocks neighboring to the second partition based on the source information is implemented by the following operations. The encoder determines each neighbor block neighboring to the first partition and the second partition based on the source information. First weight value averages corresponding to respective neighbor blocks neighboring to the first partition for the at least two pixel positions is determined to obtain the first weight value set of respective neighbor blocks, the first weight value set comprising the first weight value averages corresponding to respective neighbor blocks. Second weight value averages corresponding to respective neighbor blocks neighboring to the second partition for the at least two pixel positions is determined to obtain the second weight value set of respective neighbor blocks, the second weight value set comprising the second weight value averages corresponding to respective neighbor blocks.

In the second manner, the encoder determines a first distance set between respective neighbor blocks neighboring to the first partition and a partitioning line and a second distance set between respective neighbor blocks neighboring to the second partition and the partitioning line based on the source information, determines the first motion information mapping table from the merge candidate list based on the first distance set, and determines the second motion information mapping table from the merge candidate list based on the second distance set.

In some embodiments of the application, the encoder determines the first motion information mapping table from the merge candidate list based on the first distance set, and determines the second motion information mapping table from the merge candidate list based on the second distance set. In the embodiment of the disclosure, the encoder sequences the first distance set to obtain third ranked source information of respective neighbor blocks. A first merge motion information index consistent in ranking with the third ranked source information is determined from the merge candidate list. The merge motion information index is numbered sequentially to obtain an index of first candidate motion information, and a mapping relationship between the index of the first candidate motion information and the corresponding merge motion information index is determined as the first motion information mapping table. The second distance set is ranked to obtain fourth ranked source information of respective neighbor blocks. A second merge motion information index consistent in ranking with the fourth ranked source information is determined from the merge candidate list. The second merge motion information index is numbered sequentially to obtain an index of second candidate motion information, and a mapping relationship between the index of the second candidate motion information and the corresponding merge motion information index is determined as the second motion information mapping table.

In some embodiments of the application, the process that the encoder determines a first distance set between respective neighbor blocks neighboring to the first partition and a partitioning line and a second distance set between respective neighbor blocks neighboring to the second partition and the partitioning line based on the source information may include manner A and manner B as follows.

In manner A, the encoder determines each neighbor block neighboring to the first partition and the second partition based on the source information, determines a first neighbor pixel position of the current block corresponding to each neighbor block, determines the first distance set, in the first partition, between the first neighbor pixel positions and the partitioning line, and determines the second distance set, in the second partition, between the first neighbor pixel positions and the partitioning line.

In manner B, the encoder determines each neighbor block neighboring to the first partition and the second partition based on the source information, determines a first pixel position corresponding to each neighbor block, determines the first distance set, in the first partition, between the first pixel position and the partitioning line, and determines the second distance set between the first pixel positions in the second partition and the partitioning line.

In S204, the inter prediction value of the current block is determined based on the first motion information mapping table, the second motion information mapping table, and the merge candidate list.

In some embodiments of the application, after S202, the encoder constructs the second motion information mapping table of the second partition based on the attribute information and the merge candidate list, and determines the inter prediction value of the current block based on the second motion information mapping table and the merge candidate list. The attribute information includes source information.

In some embodiments of the application, the attribute information includes source information. The GPM parameter includes a first motion information index. The first target motion information index is a position in the first motion information mapping table. S203 may be implemented by the following operations. The encoder determines the first motion information mapping table and the second motion information mapping table based on the source information. First motion information of the first partition is determined from the merge candidate list based on the first target motion information index and the first motion information mapping table, the first target motion information index being written to the bitstream. The first motion information is deduplicated from the merge candidate list to obtain a deduplicated merge candidate list. The second motion information mapping table is determined from the deduplicated merge candidate list based on the source information.

In some embodiments of the application, an implementation process of S204 may further include the following operations. First motion information with a highest priority is determined from the merge candidate list based on the first motion information mapping table. Second motion information with a highest priority is determined from the merge candidate list based on the second motion information mapping table. The inter prediction value of the current block is determined based on the first motion information and the second motion information.

In some embodiments of the application, the encoder calculates a first predicted value of the first partition by using the first motion information, calculates a second predicted value of the second partition by using the second motion information, and performs weighted merging on the first predicted value and the second predicted value to obtain the inter prediction value of the current block.

In some embodiments of the application, after ranking the first weight value set based on a weight value of the first partition to obtain first ranked source information of respective neighbor blocks and ranking the second weight value set based on a weight value of the second partition to obtain second ranked source information of respective neighbor blocks, the encoder determines first motion information corresponding to a highest ranking priority in the first ranked source information from the merge candidate list, determines second motion information corresponding to a highest ranking priority in the second ranked source information from the merge candidate list, and determines the inter prediction value of the current block based on the first motion information and the second motion information.

Alternatively, after ranking the first distance set to obtain the third ranked source information of respective neighbor blocks and ranking the second distance set to obtain the fourth ranked source information of respective neighbor blocks, the encoder determines first motion information corresponding to a highest ranking priority in the third ranked source information from the merge candidate list, determines second motion information corresponding to a highest ranking priority in the fourth ranked source information from the merge candidate list, and determines the inter prediction value of the current block based on the first motion information and the second motion information.

In some embodiments of the application, after S101 and before S104, when the prediction mode parameter indicates to determine the inter prediction value of the current block by using GPM, the encoder determines a GPM parameter of the current block, acquires a reconstructed motion information mapping table of the first partition and a reconstructed motion information mapping table of the second partition, determines a present GPM according to the GPM parameter of the current block, determines a first motion information mapping table corresponding to the present GPM from the reconstructed motion information mapping table of the first partition, and determines a second motion information mapping table corresponding to the present GPM from the reconstructed motion information mapping table of the second partition.

In some embodiments of the application, after S101, when the prediction mode parameter indicates to determine the inter prediction value of the current block by using GPM, the encoder determines a GPM parameter of the current block and attribute information of a neighbor block of the current block and motion information corresponding to the attribute information, constructs a first motion information candidate list and a second motion information candidate list respectively based on the attribute information of the neighbor block of the current block and the motion information corresponding to the attribute information, and determines the inter prediction value of the current block based on the first motion information candidate list and the second motion information candidate list. The attribute information includes source information.

It can be understood that, during GPM-based prediction, the motion information mapping tables corresponding to the partitioned first partition and second partition may be constructed respectively, so that respective best motion information may be obtained from the merge candidate list based on the motion information mapping tables to predict the current block. As such, motion information candidates are constructed for the two partitions partitioned by using the GPM respectively, and are used for different partitions respectively. Therefore, constructing respective merge mapping tables for different partitions improves the accuracy of selecting motion information for each partition, and further improves an inter prediction effect.

Based on the inter prediction method of the present application, a specific inter prediction implementation process is provided. Descriptions are made taking an encoder as an example. The process includes the following operations.

At block 1, use condition and syntax parsing

It is to be noted that, currently in VTM8.0, a coding unit corresponding to each current block needs to satisfy some limitations for use of a GPM-based prediction mode. Exemplarily, the following limitations may be included.

(a) A Sequence Parameter Set (SPS) allows the GPM-based prediction mode to be used.

(b) A coded image region of the current block belongs to a bidirectional prediction slice (B slice).

(c) There is made such a size limitation that both a width and height need to be more than or equal to 8 and less than or equal to 4 and both a width-height ratio and height-width ratio of the current block are less than 8.

(d) Prediction for the current block is not general merge prediction, merge_subblock prediction, affine prediction, and Composed Intra Inter Prediction (CIIP).

(e) The GPM is unavailable to a chrominance component in a 4:0:0 format.

Table 2 shows CU syntax descriptions corresponding the current block.

Here, ae(v) represents a context-adaptive arithmetic entropy-coded syntax element. merge_gpm_idx0[x0][y0] represents a position of an MV of partition A in a merge list. merge_gpm_idx1[x0][y0] represents a position of an MV of partition B in the merge list. MaxNumGpmMergeCand is determined by a table length after duplicate checking and deduplicating.

At block 2, motion information mapping tables or motion information lists corresponding to two partitions are constructed respectively.

At block 3, MVs of the two partitions (partition A first and then partition B) are acquired.

At block 4, the encoder performs a GPM-based prediction process.

The GPM-based prediction process in the encoder corresponding to VVC Draft8 will be introduced below in detail.

Figure 12:
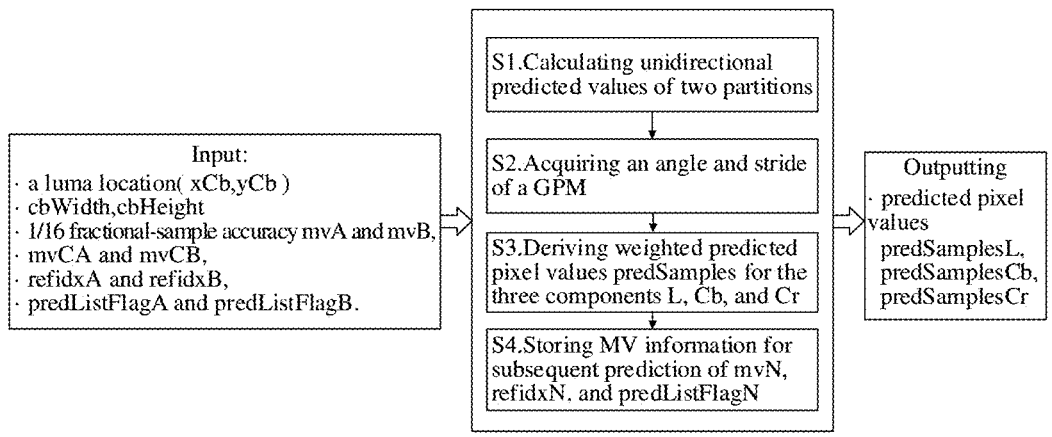
FIG. 12 is an exemplary schematic diagram of a GPM-based prediction process according to an embodiment of the disclosure.

FIG. 12 is a schematic diagram of a GPM-based prediction process according to an embodiment of the disclosure. An input of the prediction process includes:

a luma location(xCb,yCb),
cbWidth,cbHeight,
1/16 fractional-sample accuracy mvA and mvB,
mvCA and mvCB,
refidxA and refidxB, and
predListFlagA and predListFlagB.

For the input information, the prediction process specifically includes the following operations.

In S1, unidirectional predicted values of the two partitions are calculated.

The GPM reuses a conventional merge list, and constructs a unidirectional merge list of the GPM by parity check. Merge candidates of sub partitions partitioned by the GPM are selected from the unidirectional merge candidate list.

Then, reference frame lists refPicLN and predicted pixel values predSamplesLN of sub-pixels are derived for three components L, Cb, and Cr, N being A or B. This step is the same as a general inter prediction technology. That is, unidirectional motion compensation predicted values of the two partitions are calculated by using an existing motion compensation method respectively for a final weighted merging process of the GPM. Motion compensation herein is the same as a conventional motion compensation process. That is, pixel values of corresponding regions are found by MVs and duplicated.

In S2, an angle and stride of the GPM are acquired.

When the GPM is used for the present prediction block, a corresponding angle angleIdx and stride distanceIdx may be looked up according to a partition mode index merge_gpm_partition_idx selected for the current block. Table 1 shows a mapping table of the partition mode.

In S3, weighted predicted pixel values predSamples are derived for the three components L, Cb, and Cr.

In S3.1, a predicted value of the present luminance block is calculated.

In S3.1.1, a predefined weight matrix is clipped to obtain a weight mask matrix of the present luminance block.

1) First, acquisition of the weight matrix requires calculation of an offset Offset(x,y) of a top-left corner of the current block corresponding to a coordinate origin based on the current block and the partition mode for the current block. The coordinate origin is at a geometrical center point of a block of the same size, the partitioning line passing through the geometrical center point of the block at the same angle.

Figure 13:
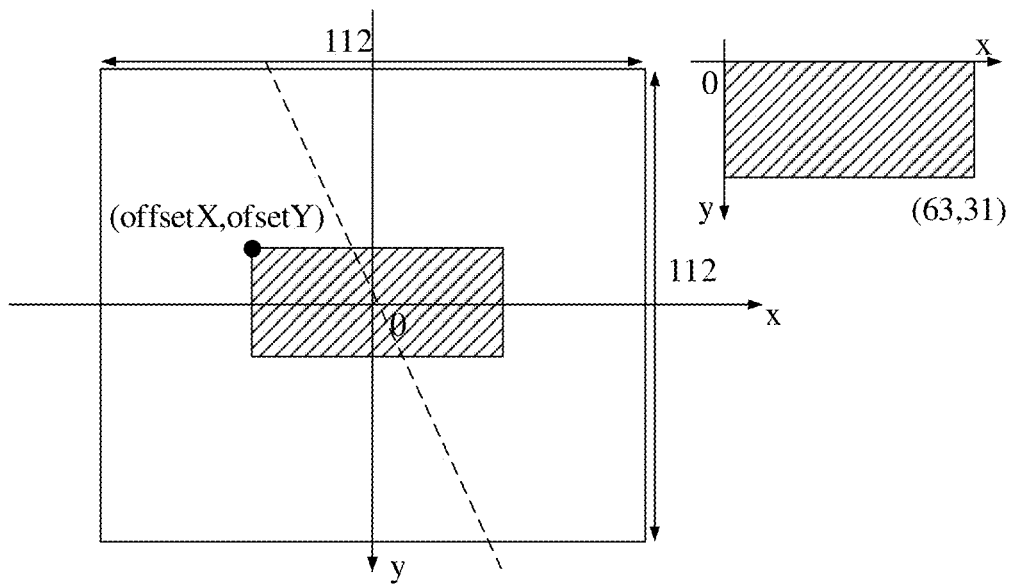
FIG. 13 is an exemplary schematic diagram of a partition mode for a current block according to an embodiment of the disclosure.

FIG. 13 is a schematic diagram of a partition mode for a current block according to an embodiment of the disclosure. As shown in FIG. 13, the dashed line represents the partitioning line, the white background is determined according to current limitations, and the shaded region is the current block. An offset value (OffsetX, OffsetY) of the top-left corner of the current block corresponding to the coordinate origin is calculated based on the current block and the partition mode for the current block, and a maximum motion range (112×112) of a maximum block (64×64) corresponding to the coordinate system is further determined. If the partitioning line does not pass through a center block of the block, a relative position of the partitioning line remains unchanged, and a position of this block in the coordinate system is moves, thereby implement partitioning appropriately.

In the embodiment of the disclosure, size information of the current block of the encoder includes a height H of the current block and a width W of the current block. Then, a coordinate region where the current block is located may be determined, and position information of each pixel, i.e., coordinate information (x, y) of each pixel, in the current block may further be determined. The encoder may determine a weight index corresponding to the pixel in the current block according to angle index information, a preset angle mapping table, and the position information of the pixel in the current block.

In some embodiments of the application, the operation that the encoder may determine a weight index corresponding to the pixel in the current block according to angle index information, a preset angle mapping table, and the position information of the pixel in the current block may be implemented by the following process. The encoder determines cosine angle index information and sine angle index information according to the angle index information. The encoder performs a power reduction process on an angle of the preset angle mapping table to obtain an updated angle mapping table. The encoder determines the weight index corresponding to the pixel in the current block according to the cosine angle index information, the sine angle index information, and the updated angle mapping table in combination with the position information of the pixel in the current block respectively.

Exemplarily, the cosine angle index information may be obtained according to expression (1), and the sine angle index information may be obtained according to expression (2). Expression (1) and expression (2) are as follows.

$$\text{displacement}X = \text{angleIdx} \quad (1)$$

$$\text{displacement}Y = (\text{displacement}X + 8)\%32 \quad (2)$$

displacementX represents the cosine angle index information, displacementY represents the sine angle index information, and angleIdx represents the angle index information.

It is to be noted that an index number cos(a) corresponding to a present angle is displacementX, and a corresponding index number-sin(a) is displacementY.

Since related information of partition A and partition B in a bitstream is transmitted in sequence, ranking of the two partitions needs to follow a certain principle. That is, a partFlip value is calculated through the following formula, specifically as follows.

$$\text{partFlip} = (\text{angleIdx} >= 13 \,\&\&\, \text{angleIdx} <= 27)?0:1 \quad (3)$$

partFlip is used to indicate distribution positions of partition A and partition B in the current block. Specifically, if partFlip is 0, it indicates that the side where a distance weightIdx, subsequently obtained through formula (8), between a point and the partitioning line is negative is partition A and the opposite side of the partitioning line is partition B. If partFlip is 1, it indicates the opposite meaning, namely the side where weightIdx is positive is partition A and the opposite side (i.e., the side where weightIdx is negative) is partition B.

A key parameter shiftHor is calculated through the following two formulas.

$$\text{hwRatio} = nH/nW \quad (4)$$

hwRatio is a ratio of height of CU to width of CU.

$$\text{shiftHor} = (\text{angleIdx} \% 16 == 8 \,||\, (\text{angleIdx} \% 16 != 0 \,\&\&\, \text{hwRatio} > 0)) \,?\, 0:1 \quad (5)$$

The meaning of shiftHor is determined according to a displacement direction between different partitioning lines at the same angle. If a value of shiftHor is 0, the partitioning line may be deviated on axis Y. If the value of shiftHor is 1, the partitioning line may be deviated on axis X.

Then, the offset values offsetX and offsetY of the present prediction block are calculated through formulas 6 to 7 according to the size and partition information of the present prediction block.

In case of shiftHor==0, the current block has an offset value related to the height of the current block in a vertical direction. In such case, the offset information is shown as follows.

$$\text{offset}X = (-nW) >> 1$$

$$\text{offset}Y = ((-nH) >> 1) + \text{angleIdx} < 16?(\text{distanceIdx} * nH) >> 3 : -((\text{distanceIdx} * nH) >> 3) \quad (6)$$

If an offset direction identity value is equal to 1, namely shiftHor is equal to 1, the current block has an offset value related to the width of the current block in the vertical direction. In such case, the offset information is shown as follows.

$$\text{offset}X = ((-nW) >> 1) + \text{angleIdx} < 16?(\text{distanceIdx} * nW) >> 3 : -((\text{distanceIdx} * nW) >> 3$$

$$\text{offset}Y = (-nH) >> 1 \quad (7)$$

">>" represents a right-shift operator, nW represents the width of the current block, and nH represents the height of the current block.

2) After the offset information offsetX and offsetY is determined, a weight index value (represented by weightIdx) at a present pixel may be calculated according to a pixel position in the current block, and a weight value at the present pixel may further be calculated through formulas 8 to 10, thereby obtaining the weight matrix of the current block.

$$\text{weightIdx} = (((x * \text{sub}W + \text{offset}X) << 1) + 1) * \text{disLut}[\text{displacement}X] + (((y * \text{sub}H + \text{offset}Y) << 1) + 1) * \text{disLut}[\text{displacement}Y] \quad (8)$$

$$\text{weightIdx}L = \text{partFlip}?32 + \text{weightIdx}:32 - \text{weightIdx} \quad (9)$$

$$w\text{Value} = \text{Clip3}(0,8,(\text{weightIdx}L+4)>>3) \quad (10)$$

clip3 represents a clipping operator, 0 represents a lower bound value, and 8 represents an upper bound value. For example, clip3(i, j, x) represents that: x is valued to i when being less than i; x is valued to j when being greater than j; and x is valued to x when being more than or equal to i and less than or equal to j.

In addition, Table 3 provides a geometrical partitioning line distance arrangement lookup table example. disLut[ ] used in formula (8) is as shown in Table 4. subW and subH represent down-sampling rates. If a YUV format of the current block is a 420 format, subW and subH may both be 2. The used disLut[ ] is as shown in Table 4. subW and subH represent down-sampling rates. If a 420 format is used, subW and subH are both 2. Luminance does not need down-sampling, and a chrominance weight is obtained by down-sampling a luminance weight, referring to S3.2.

TABLE 4

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | -2 | -4 | -4 | -8 | -8 |
| idx | 16 | 18 | 19 | 20 | 21 | 22 | 24 | 26 | 27 | 28 | 29 | 30 |
| disLut[idx] | -8 | -8 | -8 | -4 | -4 | -2 | 0 | 2 | 4 | 4 | 8 | 8 |

Here, if an absolute value of weightIdx is smaller, it indicates that the present pixel is closer to an edge of the partition, and a weight distribution of the pixel on the two partitions A and B is more even.

In S3.1.2, pixel-wise weighting is performed on the unidirectional predicted values of the two partitions to obtain a final GPM-based prediction block. Calculation for weighting is specifically implemented through formula (11).

$$pb\text{Samples}[x][y] = \text{Clip3}(0,(1<<\text{BitDepth})-1,(\text{pred-Samples}LA[x][y]*w\text{Value}+\text{predSamples}LB[x][y]* \\ (8-w\text{Value})+\text{offset1})>>\text{shift1}) \quad (11)$$

BitDepth represents a bit depth, offset1 is used for rounding, and shift1 is used to recover a predicted value obtained by weighted averaging to the same bit depth as an input video. offset1 and shift1 are calculated through formulas 12 to 13.

$$\text{shift1} = \text{Max}(5,17-\text{BitDepth}) \quad (12)$$

$$\text{offset1} = 1<<(\text{shift1}-1) \quad (13)$$

In S3.2, predicted values of the present chrominance blocks (Cb and Cr) are calculated.

Figures 14A, 14B:
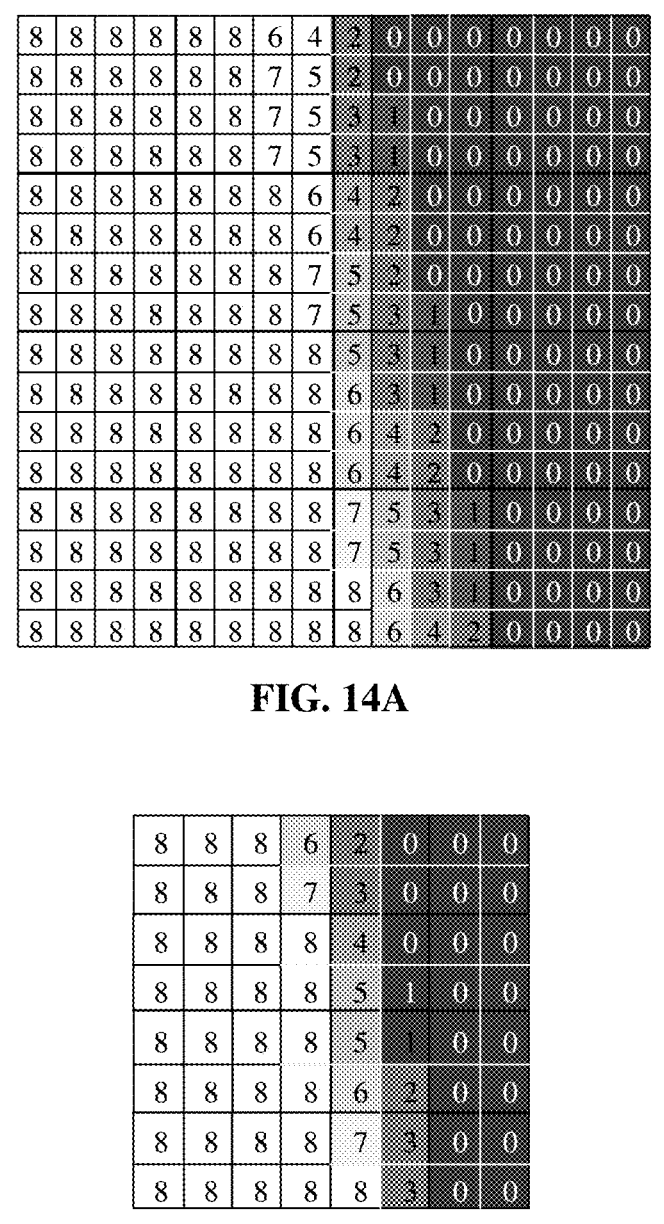

A luminance sample weight of a top-left corner of each 2×2 block in FIG. 14A is acquired directly as a chrominance sample weight at present (x, y). That is, the luminance sample weight is down-sampled to obtain a chrominance weight matrix of the current block in FIG. 14B. Calculation of chrominance weighting is also implemented through formula (11).

Sampling relationships of luminance and chrominance weight matrices are shown in FIGS. 14A and 14B.

In S4, MV information is stored for subsequent prediction of mvN, refidxN, and predListFlagN.

This storage process is implemented by using a motion mask matrix of the present luminance block. If the predicted value is completely from partition A, an MV of partition A is recorded. If the predicted value is completely from partition B, an MV of partition B is recorded. Otherwise, MVs of both partitions are simultaneously recorded. Calculation of a motion mask is substantially the same as that of the luminance weight matrix. An offset is calculated first. The offset is calculated through formulas 14 to 17.

If an offset direction identity value is equal to 0, namely shiftHor is equal to 0, the offset information is shown as follows.

$$\text{offset}X = (-cb\text{Width})>>1 \quad (14)$$

$$\text{offset}Y = ((-cb\text{Height})>>1) + (\text{angleIdx}<16? \\ (\text{distanceIdx}*cb\text{Height})>>3:- \\ ((\text{distanceIdx}*cb\text{Height})>>3)) \quad (15)$$

If the offset direction identity value is equal to 1, namely shiftHor is equal to 1, the offset information is shown as follows.

$$\text{offset}X = ((-cb\text{Width})>>1) + (\text{angleIdx}<16? \\ (\text{distanceIdx}*cb\text{Width})>>3:- \\ ((\text{distanceIdx}*cb\text{Width})>>3)) \quad (16)$$

$$\text{offset}Y = (-cb\text{Height})>>1 \quad (17)$$

cbWidth and cbHeight represent a width and height of the motion mask matrix corresponding to the GPM-based prediction block (i.e., a width and height of the luminance component of the current block).

Since the motion mask matrix of the GPM-based prediction block is still calculated by taking a 4×4 Subblock (SB) as a unit, calculation of a motion index value (which may be represented by motionIdx) at a geometrical center (4i+2, 4j+2) of each 4×4 SB is similar to that of the weight index value weightIdx in formula (8), specifically as follows.

$$\text{motionIdx} = (((4*x\text{SbIdx}+\text{offset}X)<<1)+5)*\text{disLut}[\text{displacement}X]+(((4*y\text{SbIdx}+\text{offset}Y)<<1)+5)*\text{disLut}[\text{displacement}Y] \quad (18)$$

Then, MV information needed to be stored for a present 4×4 SB is determined. Like predictive weighting, whether the present SB is in partition A and partition B needs to be determined first.

$$\text{partIdx} = (\text{angleIdx}>=13\&\&\text{angleIdx}<=27)?0:1 \quad (19)$$

(xSbIdx, ySbIdx) represents SB coordinates of each 4×4 SB in the present CU. Ranges of the coordinates are xSbIdx=0 . . . numSbX−1 and ySbIdx=0 . . . numSbY−1. partIdx represents whether the two partitions need to be flipped.

$$s\text{Type} = \text{abs}(\text{motionIdx})<32?2:(\text{motionIdx}<=0?(1-\text{partIdx}):\text{partIdx}) \quad (20)$$

In the embodiment of the disclosure, an output of the prediction process includes the predicted pixel values predSamplesL, predSamplesCb, and predSamplesCr.

Then, whether a unidirectional MV and a bidirectional MV is stored for each 4×4 SB is judged according to a magnitude of abs(motionIdx) at the geometrical center (4i+2, 4j+2) of the present SB. A specific judgment process is as follows.

If sType is 2, the constructed bidirectional MV is stored for the current block.

Otherwise, if sType is 0, MVA of the first partition is stored for the current block.

If sType is 1, MVB of the second partition is stored for the current block.

The stored MV information is used for MV prediction of a subsequent CB.

At block 5, the encoder performs a coding process of a related syntax of the GPM-based prediction mode.

In the encoder, the GPM and another inter prediction mode are considered as mutually competitive modes. The modes are selected according to RDO or other strategies, and a selection result is transmitted to a decoder through a bitstream in form of a syntax element, i.e., the write operation of the syntax in 1). This process is the inverse of the parsing process. Reference option position information m and n selected from merge lists of the two partitions A and B respectively is obtained first, and then syntax elements are assigned according to the following formulas.

merge_gpm_idx0[$xCb$][$yCb$]=$m$ merge_gpm_idx1[$xCb$][$yCb$]=$n$−(merge_gpm_idx1 [$xCb$][$yCb$]>=$m$)?1:0

After obtaining the predicted value, the encoder performs binarization and entropy coding on the predicted value, and finally writes the predicted value to a bitstream for transmission.

Figure 15:
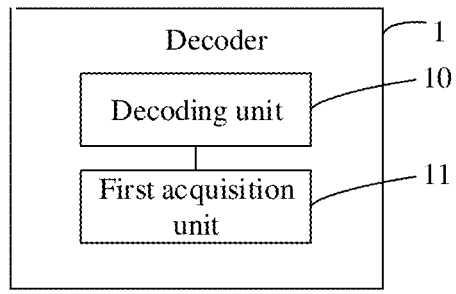
FIG. 15 is a first structure diagram of a decoder according to an embodiment of the disclosure.

As shown in FIG. 15, an embodiment of the disclosure provides a decoder 1, which includes a decoding unit 10 and a first acquisition unit 11.

The decoding unit 10 is configured to parse a bitstream to determine a prediction mode parameter of a current block.

The first acquisition unit 11 is configured to determine a GPM parameter of the current block and a merge candidate list of the current block and attribute information of motion information in the merge candidate list when the prediction mode parameter indicates to determine an inter prediction value of the current block by using GPM, and determine a first motion information mapping table of a first partition and a second motion information mapping table of a second partition according to the GPM parameter, the merge candidate list, and the attribute information.

The decoding unit 10 is further configured to determine the inter prediction value of the current block based on the first motion information mapping table, the second motion information mapping table, and the merge candidate list.

In some embodiments of the application, the first motion information mapping table represents correspondences between indices of first candidate motion information corresponding to the first partition and motion indices in the merge candidate list, and the second motion information mapping table represents a correspondence between an index of second candidate motion information corresponding to the first partition and a motion index in the merge candidate list.

In some embodiments of the application, the attribute information includes source information. The first acquisition unit 11 is further configured to partition the current block by using the GPM according to the GPM parameter to determine the first partition and the second partition, and determine the first motion information mapping table and the second motion information mapping table based on the source information and the merge candidate list.

In some embodiments of the application, the first acquisition unit 11 is further configured to determine a first weight value set of target pixel positions of respective neighbor blocks neighboring to the first partition and a second weight value set of target pixel positions of respective neighbor blocks neighboring to the second partition based on the source information, determine the first motion information mapping table from the merge candidate list based on the first weight value set, and determine the second motion information mapping table from the merge candidate list based on the second weight value set.

In some embodiments of the application, the first acquisition unit 11 is further configured to acquire a weight value of the first partition and a weight value of the second partition; sequence the first weight value set based on the weight value of the first partition to obtain first ranked source information of respective neighbor blocks; determine a first merge motion information index consistent in ranking with the first ranked source information from the merge candidate list; number the merge motion information index sequentially to obtain an index of first candidate motion information, and determine a mapping relationship between the indices of the first candidate motion information and the corresponding merge motion information indices as the first motion information mapping table; sequence the second weight value set based on the weight value of the second partition to obtain second ranked source information of respective neighbor blocks; determine a second merge motion information index consistent in ranking with the second ranked source information from the merge candidate list; and number the second merge motion information index sequentially to obtain an index of second candidate motion information, and determine a mapping relationship between the indices of the second candidate motion information and the corresponding merge motion information indices as the second motion information mapping table.

In some embodiments of the application, the first acquisition unit 11 is further configured to determine a first distance set between respective neighbor blocks neighboring to the first partition and a partitioning line and a second distance set between respective neighbor blocks neighboring to the second partition and the partitioning line based on the source information; and determine the first motion information mapping table from the merge candidate list based on the first distance set, and determine the second motion information mapping table from the merge candidate list based on the second distance set.

In some embodiments of the application, the first acquisition unit 11 is further configured to sequence the first distance set to obtain third ranked source information of respective neighbor blocks; determine a first merge motion information index consistent in ranking with the third ranked source information from the merge candidate list; number the merge motion information index sequentially to obtain an index of first candidate motion information, and determine a mapping relationship between the indices of the first candidate motion information and the corresponding merge motion information indices as the first motion information mapping table; sequence the second distance set to obtain fourth ranked source information of respective neighbor blocks; determine a second merge motion information index consistent in ranking with the fourth ranked source information from the merge candidate list; and number the second merge motion information index sequentially to obtain an index of second candidate motion information, and determine a mapping relationship between the indices of the second candidate motion information and the corresponding merge motion information indices as the second motion information mapping table.

In some embodiments of the application, the first acquisition unit 11 is further configured to determine each neighbor block neighboring to the first partition and the second partition based on the source information, determine a first neighbor pixel position of the current block corresponding to each neighbor block, determine the first distance set, in the first partition, between the first neighbor pixel positions and the partitioning line, and determine the second distance set, in the second partition, between the first neighbor pixel positions and the partitioning line.

In some embodiments of the application, the first acquisition unit 11 is further configured to determine each neighbor block neighboring to the first partition and the second partition based on the source information, determine a first pixel position corresponding to each neighbor block, determine the first distance set, in the first partition, between the first pixel position and the partitioning line, and determine the second distance set between the first pixel positions in the second partition and the partitioning line.

In some embodiments of the application, the target pixel positions are at least two pixel positions neighboring to the neighbor block in the current block. The first acquisition unit 11 is further configured to determine each neighbor block neighboring to the first partition and the second partition based on the source information, determine first weight value averages corresponding to respective neighbor blocks neighboring to the first partition for the at least two pixel positions to obtain the first weight value set of respective neighbor blocks, the first weight value set comprising the first weight value averages corresponding to respective neighbor blocks, and determine second weight value averages corresponding to respective neighbor blocks neighboring to the second partition for the at least two pixel positions to obtain the second weight value set of respective neighbor blocks, the second weight value set comprising the second weight value averages corresponding to respective neighbor blocks.

In some embodiments of the application, the first acquisition unit 11 is further configured to, after determining the GPM parameter of the current block and acquiring the merge candidate list of the current block and the attribute information of the motion information in the merge candidate list, construct the second motion information mapping table of the second partition based on the attribute information and the merge candidate list, the attribute information including source information.

The decoding unit 10 is further configured to determine the inter prediction value of the current block based on the second motion information mapping table and the merge candidate list.

In some embodiments of the application, the GPM parameter includes a first target motion information index. The first acquisition unit 11 is further configured to determine the first motion information mapping table from the merge candidate list based on the source information, determine first motion information of the first partition from the merge candidate list based on the first target motion information index and the first motion information mapping table, deduplicate the first motion information from the merge candidate list to obtain a deduplicated merge candidate list, and determine the second motion information mapping table from the deduplicated merge candidate list based on the source information.

In some embodiments of the application, the first acquisition unit 11 is further configured to determine first motion information with a highest priority from the merge candidate list based on the first motion information mapping table, and determine second motion information with a highest priority from the merge candidate list based on the second motion information mapping table.

The decoding unit 10 is further configured to determine the inter prediction value of the current block based on the first motion information and the second motion information.

In some embodiments of the application, the decoding unit 10 is further configured to calculate a first predicted value of the first partition based on the first motion information, calculate a second predicted value of the second partition based on the second motion information, and perform weighted merging on the first predicted value and the second predicted value to obtain the inter prediction value of the current block.

In some embodiments of the application, the first acquisition unit 11 is further configured to, after ranking the first weight value set based on the weight value of the first partition to obtain the first ranked source information of respective neighbor blocks and ranking the second weight value set based on the weight value of the second partition to obtain the second ranked source information of respective neighbor blocks, determine first motion information corresponding to a highest ranking priority in the first ranked source information from the merge candidate list, and determine second motion information corresponding to a highest ranking priority in the second ranked source information from the merge candidate list.

The decoding unit 10 is further configured to determine the inter prediction value of the current block based on the first motion information and the second motion information.

In some embodiments of the application, the first acquisition unit 11 is further configured to, after ranking the first distance set to obtain third ranked source information of respective neighbor blocks and ranking the second distance set to obtain fourth ranked source information of respective neighbor blocks, determine first motion information corresponding to a highest ranking priority in the third ranked source information from the merge candidate list, and determine second motion information corresponding to a highest ranking priority in the fourth ranked source information from the merge candidate list.

The decoding unit 10 is further configured to determine the inter prediction value of the current block based on the first motion information and the second motion information.

In some embodiments of the application, the first acquisition unit 11 is further configured to, after parsing the bitstream to determine the prediction mode parameter of the current block and before determining the inter prediction value of the current block based on the first motion information mapping table and the second motion information mapping table, determine a GPM parameter of the current block and a reconstructed motion information mapping table of a first partition and a reconstructed motion information mapping table of a second partition when the prediction mode parameter indicates to determine the inter prediction value of the current block by using GPM, determine a present GPM according to the GPM parameter of the current block, determine a first motion information mapping table corresponding to the present GPM from the reconstructed motion information mapping table of the first partition, and determine a second motion information mapping table corresponding to the present GPM from the reconstructed motion information mapping table of the second partition.

In some embodiments of the application, the first acquisition unit 11 is further configured to, after parsing the bitstream to determine the prediction mode parameter of the current block, determine a GPM parameter of the current block and attribute information of a neighbor block of the current block and motion information corresponding to the attribute information when the prediction mode parameter indicates to determine an inter prediction value of the current block by using GPM, and construct a first motion information candidate list and a second motion information candidate list respectively based on the attribute information of the neighbor block of the current block and the motion information corresponding to the attribute information, the attribute information including source information.

The decoding unit 10 is further configured to determine the inter prediction value of the current block based on the first motion information candidate list and the second motion information candidate list.

Figure 16:
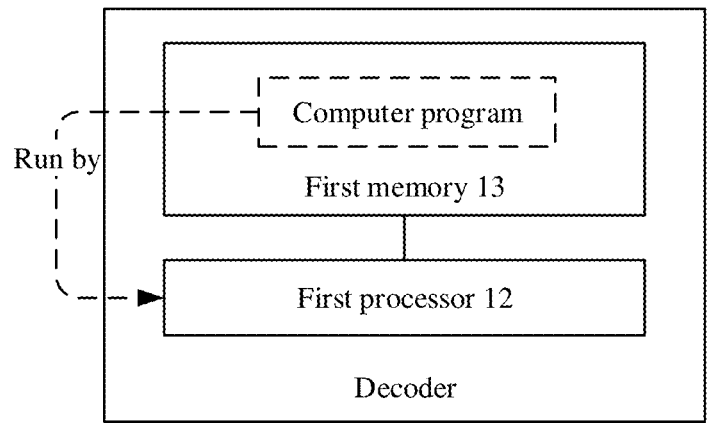
FIG. 16 is a second structure diagram of a decoder according to an embodiment of the disclosure.

In practical applications, as shown in FIG. 16, an embodiment of the disclosure provides a decoder, which includes: a first memory 13 and a first processor 12.

The first memory 13 stores a computer program capable of running in the first processor 12. The first processor 12 executes the program to implement the inter prediction method for a decoder side.

It can be understood that, during GPM-based prediction, the motion information mapping tables corresponding to the partitioned first partition and second partition may be constructed respectively based on the attribute information, so that respective best motion information may be obtained from the merge candidate list based on the motion information mapping tables to predict the current block. As such, motion information candidates are constructed for the two partitions partitioned by using the GPM respectively, and are used for different partitions respectively. Therefore, constructing respective merge mapping tables for different partitions improves the accuracy of selecting motion information for each partition, and further improves an inter prediction effect.

Figure 17:
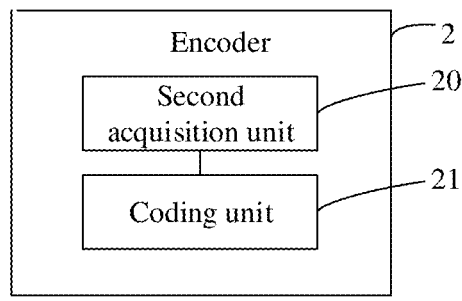
FIG. 17 is a first structure diagram of an encoder according to an embodiment of the disclosure.

As shown in FIG. 17, an embodiment of the disclosure provides an encoder 2, which includes a second acquisition unit 20 and a coding unit 21.

The second acquisition unit 20 is configured to determine a prediction mode parameter of a current block, determine a GPM parameter of the current block and a merge candidate list of the current block and attribute information of motion information in the merge candidate list when the prediction mode parameter indicates to determine an inter prediction value of the current block by using GPM, and determine a first motion information mapping table of a first partition and a second motion information mapping table of a second partition according to the GPM parameter, the merge candidate list, and the attribute information.

The coding unit 21 is configured to determine the inter prediction value of the current block based on the first motion information mapping table, the second motion information mapping table, and the merge candidate list.

In some embodiments of the application, the first motion information mapping table represents correspondences between indices of first candidate motion information corresponding to the first partition and motion indices in the merge candidate list, and the second motion information mapping table represents a correspondence between an index of second candidate motion information corresponding to the first partition and a motion index in the merge candidate list.

In some embodiments of the application, the attribute information includes source information. The second acquisition unit 20 is further configured to partition the current block by using the GPM according to the GPM parameter to determine the first partition and the second partition, and determine the first motion information mapping table and the second motion information mapping table based on the source information and the merge candidate list.

In some embodiments of the application, the second acquisition unit 20 is further configured to determine a first weight value set of target pixel positions of respective neighbor blocks neighboring to the first partition and a second weight value set of target pixel positions of respective neighbor blocks neighboring to the second partition based on the source information, determine the first motion information mapping table from the merge candidate list based on the first weight value set, and determine the second motion information mapping table from the merge candidate list based on the second weight value set.

In some embodiments of the application, the second acquisition unit 20 is further configured to acquire a weight value of the first partition and a weight value of the second partition; sequence the first weight value set based on the weight value of the first partition to obtain first ranked source information of respective neighbor blocks; determine a first merge motion information index consistent in ranking with the first ranked source information from the merge candidate list; number the merge motion information index sequentially to obtain an index of first candidate motion information, and determine a mapping relationship between the indices of the first candidate motion information and the corresponding merge motion information indices as the first motion information mapping table; sequence the second weight value set based on the weight value of the second partition to obtain second ranked source information of respective neighbor blocks; determine a second merge motion information index consistent in ranking with the second ranked source information from the merge candidate list; and number the second merge motion information index sequentially to obtain an index of second candidate motion information, and determine a mapping relationship between the indices of the second candidate motion information and the corresponding merge motion information indices as the second motion information mapping table.

In some embodiments of the application, the second acquisition unit 20 is further configured to determine a first distance set between respective neighbor blocks neighboring to the first partition and a partitioning line and a second distance set between respective neighbor blocks neighboring to the second partition and the partitioning line based on the source information; and determine the first motion information mapping table from the merge candidate list based on the first distance set, and determine the second motion information mapping table from the merge candidate list based on the second distance set.

In some embodiments of the application, the second acquisition unit 20 is further configured to sequence the first distance set to obtain third ranked source information of respective neighbor blocks; determine a first merge motion information index consistent in ranking with the third ranked source information from the merge candidate list; number the merge motion information index sequentially to obtain an index of first candidate motion information, and determine a mapping relationship between the indices of the first candidate motion information and the corresponding merge motion information indices as the first motion information mapping table; sequence the second distance set to obtain fourth ranked source information of respective neighbor blocks; determine a second merge motion information index consistent in ranking with the fourth ranked source information from the merge candidate list; and number the second merge motion information index sequentially to obtain an index of second candidate motion information, and determine a mapping relationship between the indices of the second candidate motion information and the corresponding merge motion information indices as the second motion information mapping table.

In some embodiments of the application, the second acquisition unit 20 is further configured to determine each neighbor block neighboring to the first partition and the second partition based on the source information, determine a first neighbor pixel position of the current block corresponding to each neighbor block, determine the first distance set, in the first partition, between the first neighbor pixel positions and the partitioning line, and determine the second distance set, in the second partition, between the first neighbor pixel positions and the partitioning line.

In some embodiments of the application, the second acquisition unit 20 is further configured to determine each neighbor block neighboring to the first partition and the second partition based on the source information, determine a first pixel position corresponding to each neighbor block, determine the first distance set, in the first partition, between the first pixel position and the partitioning line, and determine the second distance set between the first pixel positions in the second partition and the partitioning line.

In some embodiments of the application, the target pixel positions are at least two pixel positions neighboring to the neighbor block in the current block. The second acquisition unit 20 is further configured to determine each neighbor block neighboring to the first partition and the second partition based on the source information, determine first weight value averages corresponding to respective neighbor blocks neighboring to the first partition for the at least two pixel positions to obtain the first weight value set of respective neighbor blocks, the first weight value set comprising the first weight value averages corresponding to respective neighbor blocks, and determine second weight value averages corresponding to respective neighbor blocks neighboring to the second partition for the at least two pixel positions to obtain the second weight value set of respective neighbor blocks, the second weight value set comprising the second weight value averages corresponding to respective neighbor blocks.

In some embodiments of the application, the second acquisition unit 20 is further configured to, after determining the GPM parameter of the current block and acquiring the merge candidate list of the current block and the attribute information of the motion information in the merge candidate list, construct the second motion information mapping table of the second partition based on the attribute information and the merge candidate list, the attribute information including source information.

The coding unit 21 is further configured to determine the inter prediction value of the current block based on the second motion information mapping table and the merge candidate list.

In some embodiments of the application, the GPM parameter includes a first target motion information index. The second acquisition unit 20 is further configured to determine the first motion information mapping table from the merge candidate list based on the source information, determine first motion information of the first partition from the merge candidate list based on the first target motion information index and the first motion information mapping table, deduplicate the first motion information from the merge candidate list to obtain a deduplicated merge candidate list, and determine the second motion information mapping table from the deduplicated merge candidate list based on the source information.

In some embodiments of the application, the second acquisition unit 20 is further configured to determine first motion information with a highest priority from the merge candidate list based on the first motion information mapping table, and determine second motion information with a highest priority from the merge candidate list based on the second motion information mapping table.

The coding unit 21 is further configured to determine the inter prediction value of the current block based on the first motion information and the second motion information.

In some embodiments of the application, the coding unit 21 is further configured to calculate a first predicted value of the first partition based on the first motion information, calculate a second predicted value of the second partition based on the second motion information, and perform weighted merging on the first predicted value and the second predicted value to obtain the inter prediction value of the current block.

In some embodiments of the application, the second acquisition unit 20 is further configured to, after ranking the first weight value set based on the weight value of the first partition to obtain the first ranked source information of respective neighbor blocks and ranking the second weight value set based on the weight value of the second partition to obtain the second ranked source information of respective neighbor blocks, determine first motion information corresponding to a highest ranking priority in the first ranked source information from the merge candidate list, and determine second motion information corresponding to a highest ranking priority in the second ranked source information from the merge candidate list.

The coding unit 20 is further configured to determine the inter prediction value of the current block based on the first motion information and the second motion information.

In some embodiments of the application, the second acquisition unit 20 is further configured to, after ranking the first distance set to obtain third ranked source information of respective neighbor blocks and ranking the second distance set to obtain fourth ranked source information of respective neighbor blocks, determine first motion information corresponding to a highest ranking priority in the third ranked source information from the merge candidate list, and determine second motion information corresponding to a highest ranking priority in the fourth ranked source information from the merge candidate list.

The coding unit 21 is further configured to determine the inter prediction value of the current block based on the first motion information and the second motion information.

In some embodiments of the application, the second acquisition unit 20 is further configured to, after determining the prediction mode parameter of the current block and before determining the inter prediction value of the current block based on the first motion information mapping table and the second motion information mapping table, determine a GPM parameter of the current block and a reconstructed motion information mapping table of a first partition and a reconstructed motion information mapping table of a second partition when the prediction mode parameter indicates to determine the inter prediction value of the current block by using GPM, determine a present GPM according to the GPM parameter of the current block, determine a first motion information mapping table corresponding to the present GPM from the reconstructed motion information mapping table of the first partition, and determine a second motion information mapping table corresponding to the present GPM from the reconstructed motion information mapping table of the second partition.

In some embodiments of the application, the second acquisition unit 20 is further configured to, after determining the prediction mode parameter of the current block, determine a GPM parameter of the current block and attribute information of a neighbor block of the current block and motion information corresponding to the attribute information when the prediction mode parameter indicates to determine an inter prediction value of the current block by using GPM, and construct a first motion information candidate list and a second motion information candidate list respectively based on the attribute information of the neighbor block of the current block and the motion information corresponding to the attribute information, the attribute information including source information.

The coding unit 21 is further configured to determine the inter prediction value of the current block based on the first motion information candidate list and the second motion information candidate list.

Figure 18:
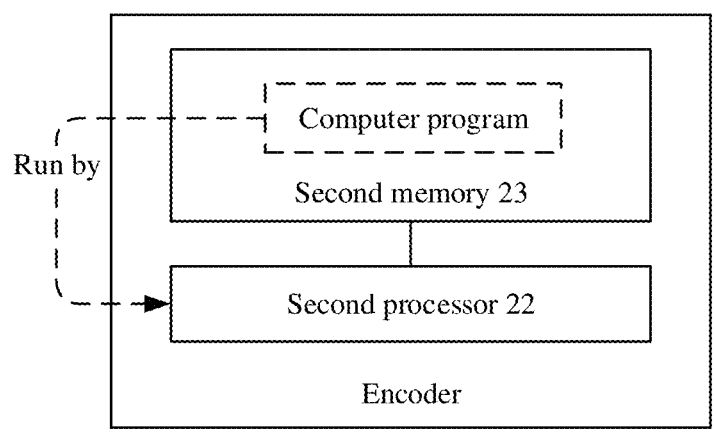
FIG. 18 is a second structure diagram of an encoder according to an embodiment of the disclosure.

In practical applications, as shown in FIG. 18, an embodiment of the disclosure provides an encoder, which includes:
a second memory 23 and a second processor 22.

The second memory 23 stores a computer program capable of running in the second processor 22. The second processor 22 executes the program to implement the inter prediction method for an encoder side.

It can be understood that, during GPM-based prediction, the motion information mapping tables corresponding to the partitioned first partition and second partition may be constructed respectively based on the attribute information, so that respective best motion information may be obtained from the merge candidate list based on the motion information mapping tables to predict the current block. As such, motion information candidates are constructed for the two partitions partitioned by using the GPM respectively, and are used for different partitions respectively. Therefore, constructing respective merge mapping tables for different partitions improves the accuracy of selecting motion information for each partition, and further improves an inter prediction effect.

The embodiments of the application provide an inter prediction method, an encoder, a decoder, and a storage medium. A bitstream is parsed to determine a prediction mode parameter of a current block. A GPM parameter of the current block and a merge candidate list of the current block and attribute information of motion information in the merge candidate list is determined when the prediction mode parameter indicates to determine an inter prediction value of the current block by using GPM. A first motion information mapping table of a first partition and a second motion information mapping table of a second partition are determined according to the GPM parameter, the merge candidate list, and the attribute information. The inter prediction value of the current block is determined based on the first motion information mapping table, the second motion information mapping table, and the merge candidate list. With the adoption of the technical implementation solutions, during GPM-based prediction, the motion information mapping tables corresponding to the partitioned first partition and second partition may be constructed respectively based on the attribute information, so that respective best motion information may be obtained from the merge candidate list based on the motion information mapping tables to predict the current block. As such, motion information candidates are constructed for the two partitions partitioned by using the GPM respectively, and are used for different partitions respectively. Therefore, constructing respective merge mapping tables for different partitions improves the accuracy of selecting motion information for each partition, and further improves an inter prediction effect.

Correspondingly, an embodiment of the disclosure provides a storage medium, which stores a computer program. The computer program is executed by a first processor to implement the inter prediction method for a decoder. Alternatively, the computer program is executed by a second processor to implement the inter prediction method for an encoder.

It is to be pointed out here that the above descriptions about the storage medium and device embodiments are similar to those about the method embodiment and beneficial effects similar to those of the method embodiment are achieved. Technical details undisclosed in the storage medium and device embodiments of the application are understood with reference to the descriptions about the method embodiment of the disclosure.

The above is only the implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

INDUSTRIAL APPLICABILITY

In the embodiments of the application, during GPM-based prediction, the motion information mapping tables corresponding to the partitioned first partition and second partition may be constructed respectively based on the attribute information, so that respective best motion information may be obtained from the merge candidate list based on the motion information mapping tables to predict the current block. As such, motion information candidates are constructed for the two partitions partitioned by using the GPM respectively, and are used for different partitions respectively. Therefore, constructing respective merge mapping tables for different partitions improves the accuracy of selecting motion information for each partition, and further improves an inter prediction effect.

The invention claimed is:

1. An inter prediction method, applied to a decoder and comprising:
   parsing a bitstream to determine a prediction mode parameter of a current block;
   determining a Geometrical Partition Mode (GPM) parameter of the current block and a merge candidate list of the current block and attribute information of motion information in the merge candidate list, when the prediction mode parameter indicates to determine an inter prediction value of the current block by using GPM, wherein the attribute information comprises source information, the source information representing a source block of the motion information;
   determining a first motion information mapping table of a first partition and a second motion information mapping table of a second partition according to the GPM parameter, the merge candidate list, and the attribute information; and
   determining an inter prediction value of the current block based on the first motion information mapping table, the second motion information mapping table, and the merge candidate list;
   wherein the determining a first motion information mapping table of a first partition and a second motion information mapping table of a second partition according to the GPM parameter, the merge candidate list, and the attribute information comprises:
   partitioning the current block by using the GPM according to the GPM parameter to determine the first partition and the second partition, and determining the first motion information mapping table and the second motion information mapping table based on the source information and the merge candidate list;

wherein after the parsing a bitstream to determine a prediction mode parameter of a current block and before the determining the inter prediction value of the current block based on the first motion information mapping table and the second motion information mapping table, the method further comprising:

determining a GPM parameter of the current block and a reconstructed motion information mapping table of a first partition and a reconstructed motion information mapping table of a second partition, when the prediction mode parameter indicates to determine the inter prediction value of the current block by using GPM;

determining a present GPM according to the GPM parameter of the current block;

determining a first motion information mapping table corresponding to the present GPM from the reconstructed motion information mapping table of the first partition; and determining a second motion information mapping table corresponding to the present GPM from the reconstructed motion information mapping table of the second partition.

2. The method of claim 1, wherein
the first motion information mapping table represents correspondences between indices of first candidate motion information corresponding to the first partition and motion indices in the merge candidate list; and
the second motion information mapping table represents correspondences between indices of second candidate motion information corresponding to the first partition and motion indices in the merge candidate list.

3. The method of claim 1, wherein the determining the first motion information mapping table and the second motion information mapping table based on the source information and the merge candidate list comprises:

determining a first weight value set of target pixel positions of respective neighbor blocks neighboring to the first partition and a second weight value set of target pixel positions of respective neighbor blocks neighboring to the second partition based on the source information; and determining the first motion information mapping table from the merge candidate list based on the first weight value set, and determining the second motion information mapping table from the merge candidate list based on the second weight value set;

wherein each of the target pixel positions is a pixel position corresponding to each neighbor block in the current block; the first weight value set comprises: for the first partition, weight values of pixels at the target pixel positions, the weight values of the pixels being sorted by size in the first weight value set; and the second weight value set comprises: for the second partition, weight values of pixels at the target pixel positions, the weight values of the pixels being sorted by size in the second weight value set.

4. The method of claim 3, wherein the determining the first motion information mapping table from the merge candidate list based on the first weight value set and determining the second motion information mapping table from the merge candidate list based on the second weight value set comprises:

acquiring a weight value of the first partition and a weight value of the second partition;

ranking the first weight value set based on the weight value of the first partition to obtain first ranked source information of respective neighbor blocks;

determining first merge motion information indices consistent in ranking with the first ranked source information from the merge candidate list;

numbering the merge motion information indices sequentially to obtain indices of first candidate motion information, and determining a mapping relationship between the indices of the first candidate motion information and the corresponding merge motion information indices as the first motion information mapping table;

ranking the second weight value set based on the weight value of the second partition to obtain second ranked source information of respective neighbor blocks;

determining second merge motion information indices consistent in ranking with the second ranked source information from the merge candidate list; and numbering the second merge motion information indices sequentially to obtain indices of second candidate motion information, and determining a mapping relationship between the indices of the second candidate motion information and the corresponding merge motion information indices as the second motion information mapping table.

5. The method of claim 1, wherein the determining the first motion information mapping table and the second motion information mapping table based on the source information and the merge candidate list comprises:

determining a first distance set between respective neighbor blocks neighboring to the first partition and a partitioning line and a second distance set between respective neighbor blocks neighboring to the second partition and the partitioning line based on the source information; and determining the first motion information mapping table from the merge candidate list based on the first distance set, and determining the second motion information mapping table from the merge candidate list based on the second distance set;

wherein the first distance set comprises: for the first partition, distances between pixels at target pixel positions and the partitioning line, the distances being sorted by size in the first distance set; the second distance set comprises: for the second partition, distances between pixels at the target pixel positions and the partitioning line, the distances being sorted by size in the second distance set; and each of the target pixel positions is a pixel position corresponding to each neighbor block in the current block;

wherein the determining the first motion information mapping table from the merge candidate list based on the first distance set and determining the second motion information mapping table from the merge candidate list based on the second distance set comprises:

ranking the first distance set to obtain third ranked source information of respective neighbor blocks;

determining first merge motion information indices consistent in ranking with the third ranked source information from the merge candidate list;

numbering the merge motion information indices sequentially to obtain indices of first candidate motion information, and determining a mapping relationship between the indices of the first candidate motion information and the corresponding merge motion information indices as the first motion information mapping table;

ranking the second distance set to obtain fourth ranked source information of respective neighbor blocks;

determining second merge motion information indices consistent in ranking with the fourth ranked source information from the merge candidate list; and numbering the second merge motion information indices sequentially to obtain indices of second candidate motion information, and determining a mapping relationship between the indices of the second candidate motion information and the corresponding merge motion information indices as the second motion information mapping table.

6. The method of claim 5, wherein the determining a first distance set between respective neighbor blocks neighboring to the first partition and a partitioning line and a second distance set between respective neighbor blocks neighboring to the second partition and the partitioning line based on the source information comprises:

determining respective neighbor blocks neighboring to the first partition and the second partition based on the source information;

determining first neighbor pixel positions of the current block corresponding to respective neighbor blocks;

determining the first distance set, in the first partition, between the first neighbor pixel positions and the partitioning line; and determining the second distance set, in the second partition, between the first neighbor pixel positions and the partitioning line.

7. The method of claim 5, wherein the determining a first distance set between respective neighbor blocks neighboring to the first partition and a partitioning line and a second distance set between respective neighbor blocks neighboring to the second partition and the partitioning line based on the source information comprises:

determining respective neighbor blocks neighboring to the first partition and the second partition based on the source information;

determining first pixel positions corresponding to respective neighbor blocks;

determining the first distance set between the first pixel positions in the first partition and the partitioning line; and determining the second distance set between the first pixel positions in the second partition and the partitioning line.

8. The method of claim 3, wherein the target pixel positions are at least two pixel positions neighboring to the neighbor block in the current block; and the determining a first weight value set of target pixel positions of respective neighbor blocks neighboring to the first partition and a second weight value set of target pixel positions of respective neighbor blocks neighboring to the second partition based on the source information comprises:

determining respective neighbor blocks neighboring to the first partition and the second partition based on the source information, determining first weight value averages corresponding to respective neighbor blocks neighboring to the first partition for the at least two pixel positions to obtain the first weight value set of respective neighbor blocks, the first weight value set comprising the first weight value averages corresponding to respective neighbor blocks, and determining second weight value averages corresponding to respective neighbor blocks neighboring to the second partition for the at least two pixel positions to obtain the second weight value set of respective neighbor blocks, the second weight value set comprising the second weight value averages corresponding to respective neighbor blocks.

9. The method of claim 2, wherein after the determining a GPM parameter of the current block and acquiring a merge candidate list of the current block and attribute information of motion information in the merge candidate list, the method further comprises:

constructing the second motion information mapping table of the second partition based on the attribute information and the merge candidate list, the attribute information comprising source information; and determining the inter prediction value of the current block based on the second motion information mapping table and the merge candidate list.

10. The method of claim 1, wherein the GPM parameter comprises a first target motion information index; the first target motion information index is a position in the first motion information mapping table; and the determining the first motion information mapping table and the second motion information mapping table based on the source information and the merge candidate list comprises:

determining the first motion information mapping table from the merge candidate list based on the source information, determining first motion information of the first partition from the merge candidate list based on the first target motion information index and the first motion information mapping table, deduplicating the first motion information from the merge candidate list to obtain a deduplicated merge candidate list, and determining the second motion information mapping table from the deduplicated merge candidate list based on the source information.

11. The method of claim 2, wherein the determining the inter prediction value of the current block based on the first motion information mapping table and the second motion information mapping table comprises:

determining first motion information with a highest priority from the merge candidate list based on the first motion information mapping table;

determining second motion information with a highest priority from the merge candidate list based on the second motion information mapping table; and determining the inter prediction value of the current block based on the first motion information and the second motion information.

12. The method of claim 11, wherein the determining the inter prediction value of the current block based on the first motion information and the second motion information comprises:

calculating a first predicted value of the first partition based on the first motion information, and calculating a second predicted value of the second partition based on the second motion information; and performing weighted merging on the first predicted value and the second predicted value to obtain the inter prediction value of the current block.

13. The method of claim 4, wherein after the ranking the first weight value set based on the weight value of the first partition to obtain first ranked source information of respective neighbor blocks and the ranking the second weight value set based on the weight value of the second partition to obtain second ranked source information of respective neighbor blocks, the method further comprises:
- determining first motion information corresponding to a highest ranking priority in the first ranked source information from the merge candidate list;
- determining second motion information corresponding to a highest ranking priority in the second ranked source information from the merge candidate list; and
- determining the inter prediction value of the current block based on the first motion information and the second motion information.

14. The method of claim 5, wherein after the ranking the first distance set to obtain third ranked source information of respective neighbor blocks and the ranking the second distance set to obtain fourth ranked source information of respective neighbor blocks, the method further comprises:
- determining first motion information corresponding to a highest ranking priority in the third ranked source information from the merge candidate list;
- determining second motion information corresponding to a highest ranking priority in the fourth ranked source information from the merge candidate list; and
- determining the inter prediction value of the current block based on the first motion information and the second motion information.

15. The method of claim 1, wherein after the parsing a bitstream to determine a prediction mode parameter of a current block, the method further comprises:
- determining a GPM parameter of the current block and attribute information of a neighbor block of the current block and motion information corresponding to the attribute information, when the prediction mode parameter indicates to determine an inter prediction value of the current block by using GPM, the attribute information comprising source information;
- constructing a first motion information candidate list and a second motion information candidate list respectively based on the attribute information of the neighbor block of the current block and the motion information corresponding to the attribute information; and
- determining the inter prediction value of the current block based on the first motion information candidate list and the second motion information candidate list.

16. An inter prediction method, applied to an encoder and comprising:
- determining a prediction mode parameter of a current block;
- determining a Geometrical Partition Mode (GPM) parameter of the current block and a merge candidate list of the current block and attribute information of motion information in the merge candidate list, when the prediction mode parameter indicates to determine an inter prediction value of the current block by using GPM, wherein the attribute information comprises source information, the source information representing a source block of the motion information;
- determining a first motion information mapping table of a first partition and a second motion information mapping table of a second partition according to the GPM parameter, the merge candidate list, and the attribute information; and
- determining an inter prediction value of the current block based on the first motion information mapping table, the second motion information mapping table, and the merge candidate list;

wherein the determining a first motion information mapping table of a first partition and a second motion information mapping table of a second partition according to the GPM parameter, the merge candidate list, and the attribute information comprises:
- partitioning the current block by using the GPM according to the GPM parameter to determine the first partition and the second partition, and
- determining the first motion information mapping table and the second motion information mapping table based on the source information and the merge candidate list;

wherein after the parsing a bitstream to determine a prediction mode parameter of a current block and before the determining the inter prediction value of the current block based on the first motion information mapping table and the second motion information mapping table, the method further comprising:
- determining a GPM parameter of the current block and a reconstructed motion information mapping table of a first partition and a reconstructed motion information mapping table of a second partition, when the prediction mode parameter indicates to determine the inter prediction value of the current block by using GPM;
- determining a present GPM according to the GPM parameter of the current block;
- determining a first motion information mapping table corresponding to the present GPM from the reconstructed motion information mapping table of the first partition; and
- determining a second motion information mapping table corresponding to the present GPM from the reconstructed motion information mapping table of the second partition.

17. A decoder, comprising a memory and a processor, wherein
the memory stores a computer program capable of running in the processor; and the processor executes the program to implement an inter prediction method, the method comprising:
- parsing a bitstream to determine a prediction mode parameter of a current block;
- determining a Geometrical Partition Mode (GPM) parameter of the current block and a merge candidate list of the current block and attribute information of motion information in the merge candidate list, when the prediction mode parameter indicates to determine an inter prediction value of the current block by using GPM, wherein the attribute information comprises source information, the source information representing a source block of the motion information;
- determining a first motion information mapping table of a first partition and a second motion information mapping table of a second partition according to the GPM parameter, the merge candidate list, and the attribute information; and
- determining an inter prediction value of the current block based on the first motion information mapping table, the second motion information mapping table, and the merge candidate list;

wherein the determining a first motion information mapping table of a first partition and a second motion information mapping table of a second partition according to the GPM parameter, the merge candidate list, and the attribute information comprises:

partitioning the current block by using the GPM according to the GPM parameter to determine the first partition and the second partition, and determining the first motion information mapping table and the second motion information mapping table based on the source information and the merge candidate list;

wherein after the parsing a bitstream to determine a prediction mode parameter of a current block and before the determining the inter prediction value of the current block based on the first motion information mapping table and the second motion information mapping table, the method further comprising:

determining a GPM parameter of the current block and a reconstructed motion information mapping table of a first partition and a reconstructed motion information mapping table of a second partition, when the prediction mode parameter indicates to determine the inter prediction value of the current block by using GPM;

determining a present GPM according to the GPM parameter of the current block;

determining a first motion information mapping table corresponding to the present GPM from the reconstructed motion information mapping table of the first partition; and determining a second motion information mapping table corresponding to the present GPM from the reconstructed motion information mapping table of the second partition.

* * * * *